(12) United States Patent  (10) Patent No.: US 7,778,946 B2
Hercus  (45) Date of Patent: Aug. 17, 2010

(54) NEURAL NETWORKS WITH LEARNING AND EXPRESSION CAPABILITY

(75) Inventor: Robert George Hercus, Kuala Lumpur (MY)

(73) Assignee: Neuramatix SDN.BHD., Kuala Lumpur (MY)

( * ) Notice: Subject to any disclaimer, the term of this patent is extended or adjusted under 35 U.S.C. 154(b) by 96 days.

(21) Appl. No.: 12/170,335

(22) Filed: Jul. 9, 2008

(65) Prior Publication Data

US 2009/0119236 A1 May 7, 2009

Related U.S. Application Data

(63) Continuation of application No. 10/560,666, filed as application No. PCT/IB2004/102119 on Jun. 21, 2004, now Pat. No. 7,412,426.

(30) Foreign Application Priority Data

Jun. 26, 2003 (MY) .............. PI 20032400

(51) Int. Cl.
 G06N 3/04 (2006.01)
 G06N 3/08 (2006.01)
(52) U.S. Cl. .......................... 706/16; 706/27
(58) Field of Classification Search .............. 706/16
 See application file for complete search history.

(56) References Cited

U.S. PATENT DOCUMENTS

| 5,091,864 | A | 2/1992 | Baji et al. |
| 5,166,539 | A | 11/1992 | Uchimura et al. |
| 5,182,794 | A | 1/1993 | Gasperi et al. |
| 5,353,383 | A | 10/1994 | Uchimura et al. |
| 5,467,429 | A | 11/1995 | Uchimura et al. |
| 5,671,335 | A | 9/1997 | Davis et al. |
| 5,712,953 | A | 1/1998 | Langs |
| 5,852,815 | A | 12/1998 | Thaler |
| 5,937,432 | A | 8/1999 | Yamaguchi et al. |
| 6,052,679 | A | 4/2000 | Aparicio, IV et al. |
| 6,195,622 | B1 | 2/2001 | Altschuler et al. |
| 6,456,993 | B1 | 9/2002 | Freund |
| 6,468,069 | B2 | 10/2002 | Lemelson et al. |
| 6,553,366 | B1 * | 4/2003 | Miller et al. ................ 1/1 |

(Continued)

FOREIGN PATENT DOCUMENTS

EP   0 245 508 B1   11/1987

(Continued)

OTHER PUBLICATIONS

Analysis and synthesis of neural networks with lower block triangular interconnecting structure, Michel, A.N.; Gray, D.L.; Circuits and Systems, IEEE Transactions on vol. 37, Issue: 10 Digital Object Identifier: 10.1109/31.103221 Publication Year: 1990, pp. 1267-1283.*

(Continued)

*Primary Examiner*—Michael Holmes
(74) *Attorney, Agent, or Firm*—Kauth, Pomeroy, Peck & Bailey LLP

(57) ABSTRACT

A neural network comprising a plurality of neurons in which any one of the plurality of neurons is able to associate with itself or another neuron in the plurality of neurons via active connections to a further neuron in the plurality of neurons.

48 Claims, 18 Drawing Sheets

U.S. PATENT DOCUMENTS

| | | | |
|---|---|---|---|
| 6,581,049 | B1 | 6/2003 | Aparicio et al. |
| 6,707,935 | B2 | 3/2004 | Kramer |
| 6,751,343 | B1 | 6/2004 | Ferrell et al. |
| 6,801,655 | B2 | 10/2004 | Woodall |
| 7,016,886 | B2 | 3/2006 | Cabana et al. |
| 7,089,217 | B2 | 8/2006 | Kasabov |
| 7,095,875 | B2 * | 8/2006 | Rundle et al. ............... 382/101 |
| 7,364,846 | B2 * | 4/2008 | Erlander et al. ................ 435/6 |
| 7,412,426 | B2 * | 8/2008 | Hercus ....................... 706/15 |
| 7,454,435 | B2 * | 11/2008 | Friedman et al. ................... 1/1 |
| 7,723,039 | B2 * | 5/2010 | Erlander et al. ................ 435/6 |
| 2005/0063565 | A1 | 3/2005 | Nagaoka et al. |
| 2006/0184462 | A1 | 8/2006 | Hawkins |
| 2007/0005531 | A1 | 1/2007 | George et al. |

FOREIGN PATENT DOCUMENTS

| | | |
|---|---|---|
| EP | 0 223 486 B1 | 8/1992 |
| EP | 0 602 717 A1 | 6/1994 |
| EP | 0 276 068 B1 | 4/1995 |
| EP | 0 360 674 B1 | 11/1995 |
| EP | 0 453 939 B1 | 7/1996 |
| EP | 0 450 522 B1 | 1/1997 |
| EP | 0 450 521 B1 | 3/1997 |
| EP | 0 599 347 B1 | 7/1998 |
| EP | 0 506 730 B1 | 11/1999 |
| EP | 0 612 033 B1 | 11/1999 |
| EP | 0 583 217 B1 | 5/2000 |
| EP | 1073012 A1 | 1/2001 |
| EP | 0 574 936 B1 | 5/2002 |
| EP | 1 197 913 B1 | 9/2003 |
| EP | 1 197 914 B1 | 10/2003 |
| EP | 1 351 188 A1 | 10/2003 |
| WO | WO 95/00920 | 1/1995 |
| WO | WO 97/29437 | 8/1997 |
| WO | WO 00/36524 | 6/2000 |
| WO | WO 02/15125 A2 | 2/2002 |

OTHER PUBLICATIONS

A Multi-layer ADaptive FUnction Neural Network (MADFUNN) for Analytical Function Recognition, Miao Kang; Palmer-Brown, D.; Neural Networks, 2006. IJCNN '06. International Joint Conference on Digital Object Identifier: 10.1109/IJCNN.2006.246895 Publication Year: 2006, pp. 1784-1789.*

Hybrid system for robust recognition of noisy speech based on evolving fuzzy neural networks and adaptive filtering, Kasabov, N.; Iliev, G.;Neural Networks, 2000. IJCNN 2000, Proceedings of the IEEE-INNS-ENNS International Joint Conference on vol. 5 Digital Object Identifier: 10.1109/IJCNN.2000.861440 Publication Year: 2000, pp. 91-96.*

A segment-based speaker adaptation neural network applied to continuous speech recognition, Fukuzawa, K.; Komori, Y.; Sawai, H.; Sugiyama, M.; Acoustics, Speech, and Signal Processing, 1992. ICASSP-92., 1992 IEEE International Conference on vol. 1 Digital Object Identifier: 10.1109/ICASSP.1992.225879 Publication Year: 1992, pp. 433-436.*

Humpert, "Bidirectional Associative Memory with Several Patterns", IJCNN, Jun. 17-21, 1990, pp. I-741-I750 and IEEE Xplore 1-page printout, printed Sep. 22, 2004, 11 pgs.

Wang, "Multi-Associated neural Networks and Their Applications to Learning and Retrieving Complex Spatio-Temporal Sequences", IEEE Transactions on Systems, Man and cybernetics, Feb. 1999, printed Sep. 21, 2004, 12 pgs.

International Search Report for International Application No. PCT/IB2004/002119, completed on Sep. 24, 2004, mailed Sep. 29, 2004, 4 pgs.

International Preliminary Report on Patentability for International Application No. PCT/IB2004/002119,completed Feb. 25, 2005, 18 pgs.

Fahlman et al., "The Cascade-Correlation Learning Architecture", source unknown, Feb. 14, 1990, pp. 1-13, title page.

Carpenter et al., "Adaptive Resonance Theory", The Handbook of Brain Theory and Neural Networks, Second Edition, Sep. 1998, pp. 1-12.

Carpenter et al., "ART 2: self-organization of stable category recognition codes for analog input patterns", Applied Optics, Dec. 1, 1987, vol. 26, No. 23, pp. 4919-4930.

Supplementary Partial European Search Report, Application No. 04 73 7088, Date of Completion Mar. 27, 2009, Date mailed Apr. 7, 2009, 6 pgs.

Ayoubi et al, "Hopfield associative memory on mesh", Circuits and Systems, 2004, ISCAAS '04, Proceedings of the 2004 International Symposium on vol. 5, May 23-26, 2004, pp. V800-V803 vol. 5.

Chtourou et al., "Neural Network Based Memory Access Prediction Support for SoC Dynamic Reconfiguration", Neural Networks, 2006, IJCNN '06; International Joint Conference; pp. 2823-2829, Digital Object Identifier 10.1109/IJCNN.2006.247210.

Diegert, "Out-of-core backpropagation", Neural Networks, 1990, 1990 IJCNN International Joint Conference on Jun. 17-21, 1990, pp. 97-103, vol. 2 Digital Object Identifier 10.1109/IJCNN.1990. 137701.

Fritzke, "Using a Library of Efficient Data Structures and Algorithms as a Neural Network Research Tool", Proceedings of International Conference on Artificial Neural Networks (ICANN), Sep. 1992, 4 pgs.

Ge et al., "The chaos in the synchrony of abnormal oscillations in a pair of neurons coupled in a gap junction", Signal Processing, 2004, Proceedings. ISCP '04, 2004 7th International Conference on vol. 3, Aug. 31-Sep. 4, 2004, p. 2210 vol. 3.

Hiraiwa et al., "Implementation of ANN on RISC processor arrays", Application Specific Array Processors, 1990, Proceedings of the International Conference of Sep. 5-7, 1990, pp. 677-688. Digital Object Identifier 10. 1109/ASAP. 1990.145502.

Johnson et al., "Learning algorithms for suppressing motion clutter in airborne array radar", Aerospace and Electronics Conference, 1997, NAECON 1997, Proceedings of the IEEE 1997 National vol. 2, Jul. 14-17, 1997, pp. 840-845, vol. 2 Digital Object Identifier 10.1109/NAECON.1997.622738.

Kanoh et al., "Basic characteristics of hardware Neuron model based on CMOS negative resistance: realization of post-inhibitory rebound firing and its application", Neural Information Processing, 1999, Proceedings. ICONIP '99, 6th International Conference on vol. 2, Nov. 16-20, 1999, pp. 579-584, vol. 2.

Kennedy et al., "C-NNAP: a dedicated platform for binary neural networks", Artificial Neural Networks, Fifth International Conference on (Conf. Publ. No. 440), Jul. 7-9, 1997, pp. 161-166.

Kim et al., "Memory based processor array for artificial neural networks", Neural Networks, 1997, International Conference on vol. 2, Jun. 9-12, 1997, pp. 969-974, vol. 2 Digital Object Identifier 10.1109/ICNN.1997.616157.

Mehlhorn et al., "Leda A Platform for Combinatorial Geometric Computing", Cambridge University Press, 1999, 16 pgs.

Mehlhorn et al., "LEDA: A Platform for Combinatorial and Geometric Computing", Communications of the ACM, Jan. 1995, vol. 38, No. 1, pp. 96-102.

Morgan et al., "RAP: a ring array processor for multilayer perception applications", Acoustics, Speech, and Signal Processing, 1990. ICASSP-90, 1990 International Conference on Apr. 3-6, 1990, pp. 1005-1008, vol. 2, Digital Object Identifier 10.1109/ICASSP.1990. 116058.

Murahashi et al., "Hardware realization of novel pulsed neural networks based on delta-sigma modulation with GHA learning rule", Circuits and Systems, 2002, APCCS '02, 2002 Asia-Pacific Conference on vol. 2, Oct. 28-31, 2002, pp. 157-162, Bol.2 Digital Object Identifier 10.1109/APCCAS.2002.1115144.

Reay et al., "Minimisation of torque ripple in a switched reluctance motor using a neural network", Artificial Neural Networks, 1993, Third International Conference on May 25-27, 1993, pp. 224-228.

Shuklin, "The Structure of a Semantic Neural Network Extracting the Meaning From a Text", Cybernetics and Systems Analysis, Mar. 2001, vol. 37, No. 2, pp. 182-186.

Tanaka et al., "Curvature and orientation estimation by neuronal structures", Computer Graphics and Imaging Processing, 2000, Proceedings XIII Brazilian Symposium on Oct. 17-20, 2000, pp. 44-51, Digital Object Identifier 10.1109/SIBGRA.2000.883893.

Yagi et al., "Dynamic model of dual layer neural network for vertebrate retina", Neural Networks, 1989, IJCNN, International Joint Conference on vol. 2, Jun. 9-12, 1989, pp. 787-789, vol. 1 Digital Object Identifier 10, 1109/IJCNN, 1989.118668.

\* cited by examiner

THE^CAT^SAT^ON^THE^MA

THE^CAT^SAT^ON^THE^MA

THE^CAT^SAT^ON^THE^

THE^CAT^SAT^ON^THE^MA

THE^CAT^SAT^ON^THE^M

THE^CAT^SAT^ON^THE^M

NEURAL NETWORKS WITH LEARNING AND EXPRESSION CAPABILITY

RELATED APPLICATIONS

This application is a continuation of U.S. patent application Ser. No. 10/560,666, filed Dec. 12, 2005 now U.S. Pat. No. 7,412,426, which is the National Stage of International Application No. PCT/IB04102119, filed Jun. 21, 2004, which claims the benefit of Malaysian Application No. P1 20032400, filed Jun. 26, 2003, the entire contents of which are incorporated herein by reference.

FIELD OF INVENTION

This invention relates to neural networks and particularly, though not exclusively, to neural networks based on one or more characteristics including temporal, spatial, intensity, magnitude, and relative position; and may be used for one or more of: learning, knowledge acquisition, discovery, data mining and expression.

BACKGROUND OF THE INVENTION

Existing neural networks are typically based on a single interpretation of Hebbian learning. This basic, Hebbian concept is often stated as "Neurons that fire together wire together". The defacto interpretation is that wiring together is effected via the synapse that connects the two neurons together. The strength of the connecting synapse is modified or weighted to reflect the importance/probability of the presynaptic neuron firing concurrently with the postsynaptic neuron, or vice versa.

Using the concept, neural networks have been developed that associate a number of input neurons to a number of output neurons via synapses. The input neurons define the input states; and the output neurons define the desired output states.

Thus nearly all existing neural networks are based on the concept of three layers: an input neuron layer, a hidden neuron layer, and an output neuron layer. FIG. 1 and FIG. 2 are illustrations of existing neural networks.

Training of such neural networks is accomplished, in its most basic form, by applying a specific input state to all the input neurons, selecting a specific output neuron to represent that input state, and adjusting the synaptic strengths or weights in the hidden layer. That is, training is conducted assuming knowledge of the desired output. After training has been completed, the application of different input states will result in different output neurons being activated with different levels of confidence. Thus recognition of an input event depends on how close the original training states match the current input state.

Such neural networks typically require extensive, repetitive training with hundreds or thousands of different input states, depending on the number of desired output neurons and the accuracy of the desired result. This results in practical networks of the order of only 10,000 input and output neurons with as many as 10 million interconnecting synapses or weights representing synapses (current existing neural networks are very small in size as compared to the capacity of the human brain which has $10^{12}$ neurons, and $10^{16}$ synaptic connections).

Furthermore, existing networks are trained on the basis of generating predefined output neurons, and can subsequently recognize inputs that closely resemble the training sets used for input. Existing neural networks are not capable of independent learning as they are trained using prior assumptions—the desired goals are represented by the output neurons. Existing neural networks are not capable of expressing or recollecting an input state based on the stimulus of any output neuron in the output layer.

Existing neural networks are trained on the basis of applying independent input states, to the network, in which the order of training is typically insignificant. On completion of extensive, repetitive training, the output neurons are not significantly dependent on the order in which input states are applied to the network. Existing neural networks provide outputs that are based entirely on the current input state. The order in which input states are applied has no bearing on the network's ability to recognize them.

Existing neural networks may have some or all of the following shortcomings:

1. they require prior training, based on predetermined or desired output goals—they do not learn;
2. they can only recognize input states (objects) similar to the input states for which they have been trained;
3. they are highly computational, and therefore slow;
4. they are computationally restricted to represent only a relatively small number of neurons;
6. they need retraining if they are to recognize different objects;
7. they cannot express or recall an input object by applying a stimulus to the output neurons;
8. they are based on concurrent stimuli of all input neurons;
9. they are not creative and they cannot express or recollect events; they can only identify/recognize events for which they have been trained;
10. they assume neurons that fire concurrently or in quick succession, are linked synaptically but do not distinguish one from the other or the order of neuron firing; and
11. each hidden layer neuron can receive inputs from multiple input neurons concurrently.

SUMMARY OF THE INVENTION

In accordance with one aspect, there is provided a neural network comprising a plurality of neurons in which any one of the plurality of neurons is able to associate or associate with itself or any other neuron in the plurality of neurons via active connections to a further neuron in the plurality of neurons. This process is referred to as learning.

In accordance with a second aspect there is provided a neural network comprising a plurality of elemental neurons, and a plurality of structural neurons for representing associations between any pair of neurons, the pair of neurons being selected from the group consisting of: both elemental neurons, both structural neurons, one structural and one elemental neuron, and one elemental neuron and one structural neuron.

Each structural neuron may represent the combined information or memory represented by a pair of neurons. The process of recalling the pair of neurons that were combined to form a structural neuron is referred to as expression. Each structural neuron may receive input from only two neurons.

The plurality of elemental neurons may be represented in the root level of the neural network structure; and each elemental neuron may represent at least one of: an elemental stimulus, a defined elemental pattern, and a defined elemental data element. Each elemental neuron may represent one or both of: basic input stimuli and output stimuli of information being processed. Each elemental neuron may be an equivalent of a neuron in a brain, the neuron in the brain being selected from the group consisting of a sensor neuron, a motor neuron, an intracortical neuron and an intercortical neuron. The information represented by a neuron may be memory, and the processing may be learning or expression.

The plurality of neuron associations may be represented in a plurality of deeper neural levels. The number of levels in the plurality of deeper levels may be determined by the extent of the memory or pattern to be processed or expressed, where a memory represents a plurality of elemental neurons. The number of elemental neurons and structural neurons required to represent the memory may be determined by the nature of the memory to be processed.

In accordance with a third aspect there is provided a neural network comprising a plurality of neurons linked by associations, all associations of neurons in a level of the neural network that is the same or deeper being able to be expressed.

A fourth aspect provides a neural network comprising a plurality of neurons, each neuron being represented by a unique addressable node in an array.

A fifth aspect provides a neural network comprising a plurality of neurons, each neuron being represented in its entirety by a single node in an array.

A sixth aspect is a neural network comprising a plurality of nodes in an array, each node in the array comprising pointers. Each pointer is a data element of the node that represents a unique address of a specific node in the array, each address representing a neuron of a plurality of neurons. Each pointer represents a synaptic connection.

A seventh aspect there is provided a neural network comprising a plurality of neurons in an array, there being pointers in each node of the array for providing expression and for learning of memories.

A penultimate aspect provides a neural network comprising a plurality of neurons, each neuron being represented by a node in an array, each node having a plurality of pointers, each pointer in each node having a specific and unique function. Except where a pointer may represent the value of an elemental stimulus in the elemental or root level neurons, each pointer contains an address of another neuron. The number of pointers required may depend on the functions being performed by the neural network. For a neural network performing learning and expression functions, the number of pointers needed will be at least four.

In this manner each neuron in the plurality of neurons may be represented by a node of the same size in the array representing the plurality of neurons, each node containing a fixed number of pointers.

Nodes in an array used to represent neurons may also maintain additional data elements other than pointers pertaining to the characteristics of each neuron. Data elements may be defined to represent the frequency of each neuron's activation, the strength of its associations, and so forth.

The present invention also extends to a computer usable medium comprising a computer program code configured to cause one or more processors to execute one or more functions to perform the methods described above.

In a final aspect there is provided a neural network wherein the neural network is bi-directional and is enabled to operate in a forward direction where nodes are derived or created from input, and in a reverse direction where Input is derived from nodes. The forward direction is learning and the reverse direction is expression.

The neural network may be used for one or more of: monitoring and predicting stock price movements, internet surveillance, internet security, computer virus and spam detection, data compression, phrase recognition in speech and text, clauses in speech and text, plagiarism detection, bioinformatics, vision recognition, semantic analysis and representation of ontologies, and robotics.

BRIEF DESCRIPTION OF THE DRAWINGS

In order that the invention may be readily understood and put into practical effect there shall now be described by way of non-limitative example only preferred embodiments of the present invention, the description being with reference to the accompanying illustrative drawings in which.

DESCRIPTION OF PREFERRED EMBODIMENTS

According to a preferred aspect the present invention provides neural networks, and a method for constructing such neural networks via neuron associations, that are based on characteristics that Include at least one of temporal, spatial, intensity, magnitude, and relative position, for the formation of memories, that consist of one or both of either input stimuli (represented by elemental neurons) or output actions (represented by elemental neurons) in a natural manner.

It also provides for either or both of memory recollection and memory expression of one or more of the memories represented by structural neurons, which represent multiple elemental stimuli. The neural network allows for the potential expression of new actions or ideas other than what it has learnt and in such a manner may exhibit creativity. Input stimuli may include one or more of: audio, visual, tactile, and so forth. Output stimuli may include one or more of: movement, motion, speech, and so forth, each defined by appropriate elemental neurons.

Figure 1:
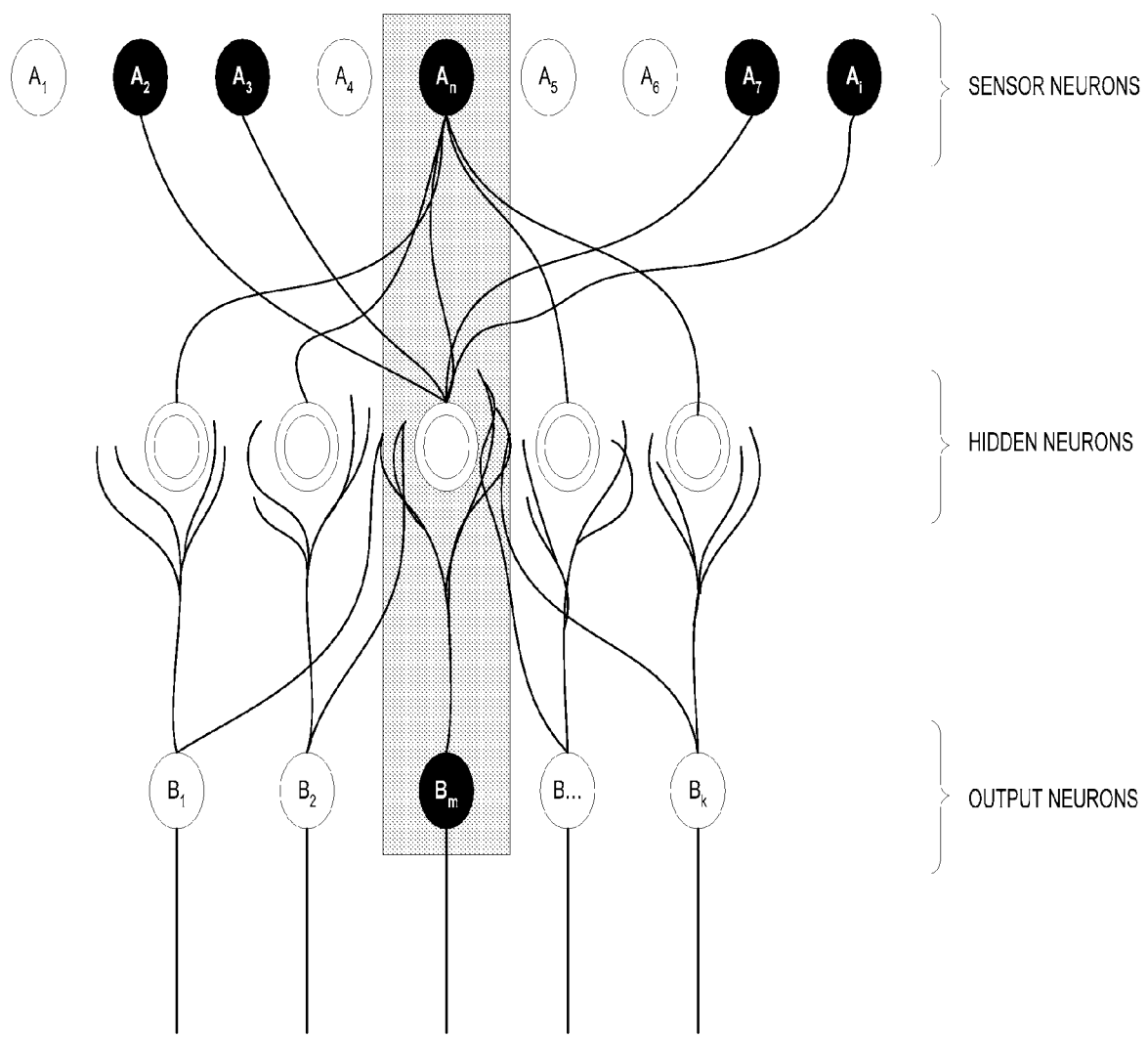
FIG. 1 is an illustration of an existing neural network structure.
Figure 2:
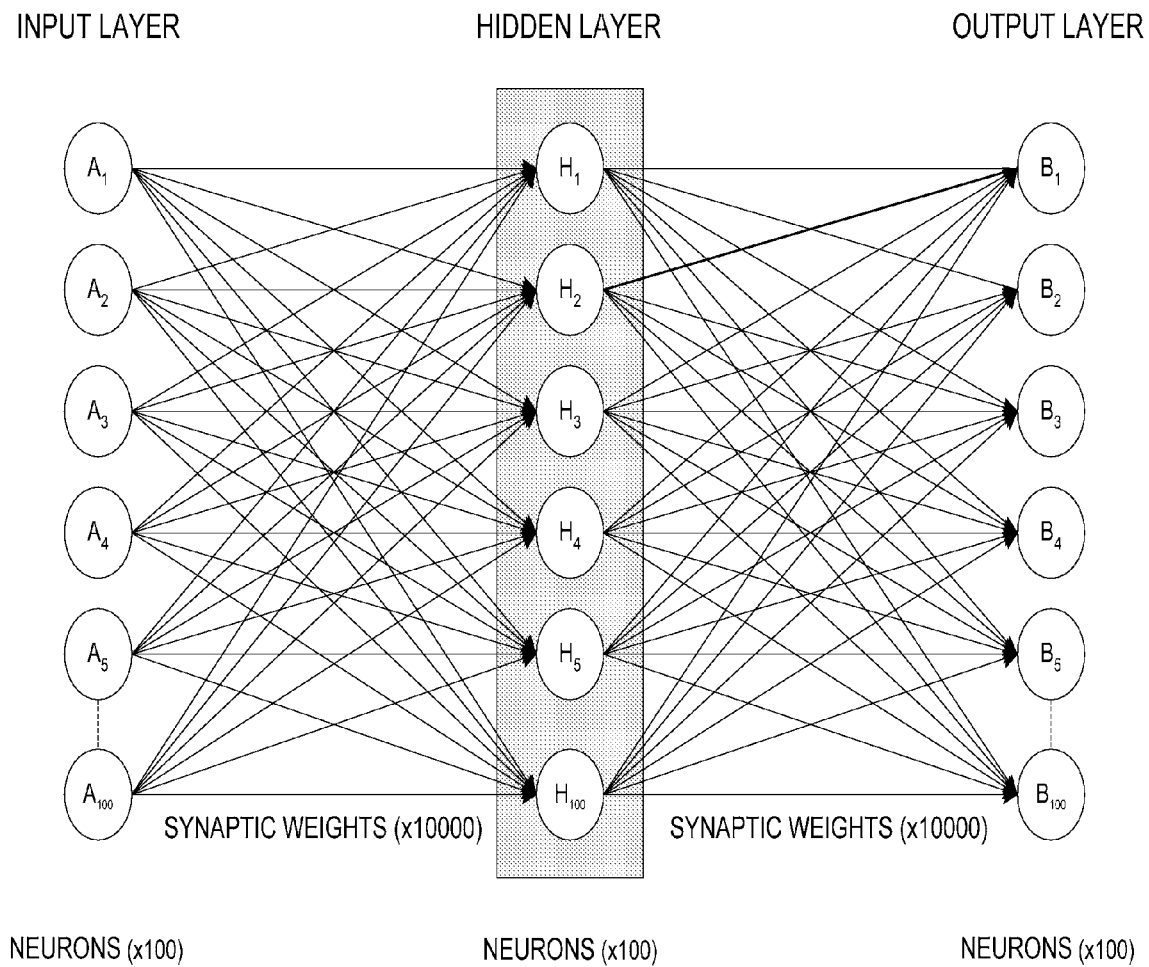
FIG. 2 is a further illustration of an existing neural network structure.
Figure 3:
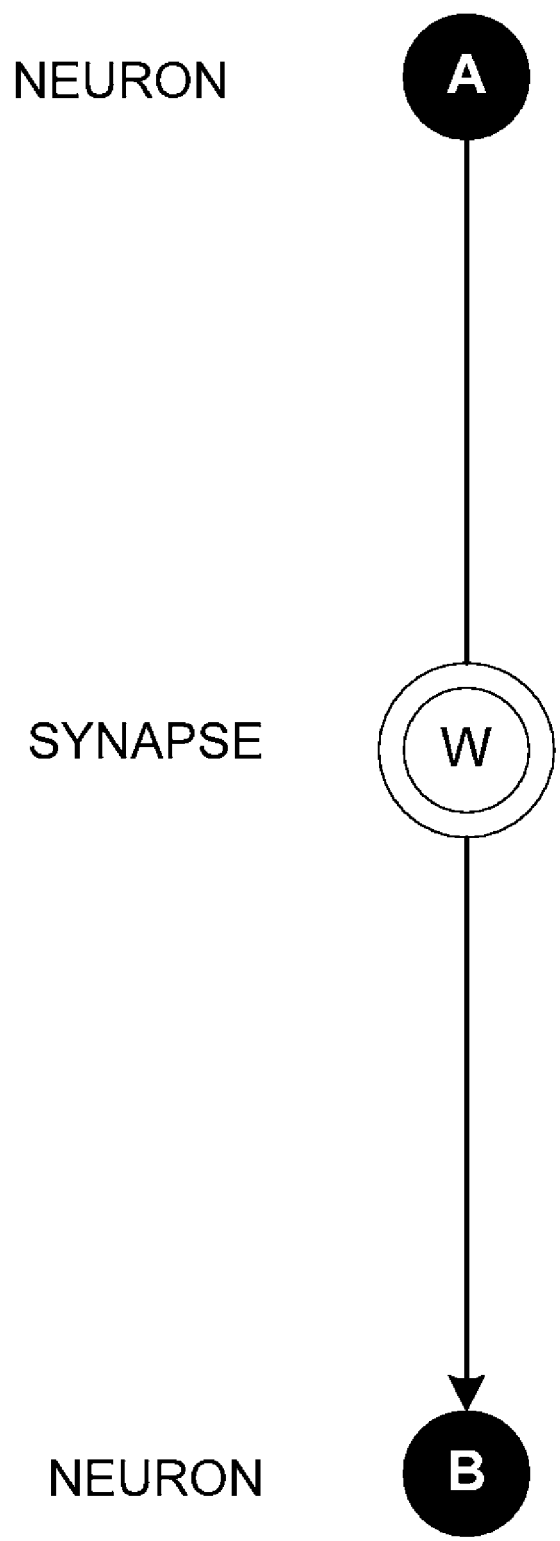
FIG. 3 is an illustration of an existing relationship between two neurons and a synapse.

Existing neural networks are based on the assumption that concurrently activating two neurons (neurons B and C) creates an active synaptic connection between them, or strengthens existing synaptic connections. This is illustrated in FIG. 3 where there are two neurons and one synapse.

Figure 4:
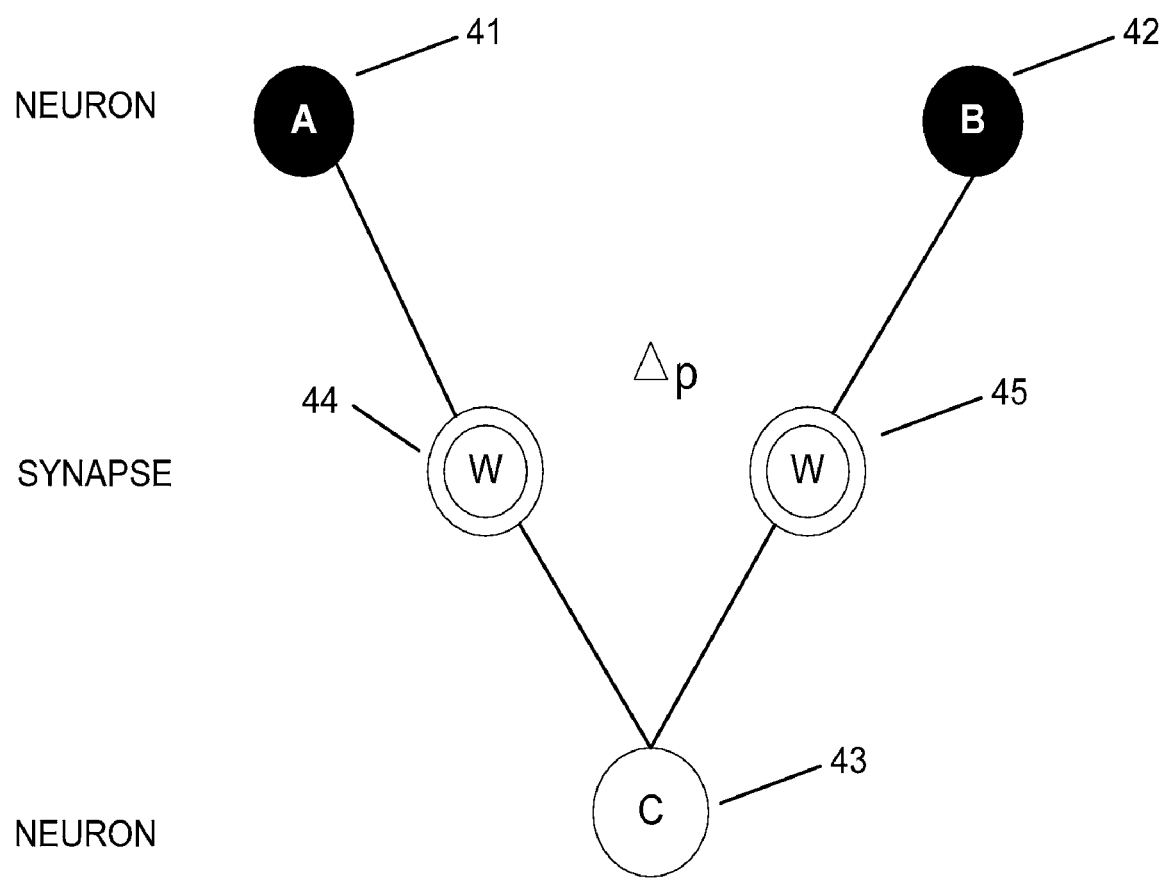
FIG. 4 is an illustration of the relationship between three neurons according to the present invention.

Accordingly to one aspect of the present invention, stimulating or activating two neurons creates an association between them via another third neuron; the associating neuron. This is illustrated in FIG. 4 where there are three neurons 41, 42 and 43 and two synapses 44 and 45. For convenience, this basic neural structure will be called a "neuronal assembly" throughout this specification. Neurons 41, 42 and 43 may be associated together based on proximal characteristics, including at least one of temporal, spatial, intensity, magnitude and relative position. Neuron 43 will be at a deeper level within the neural structure than both of neurons 41, 42. Neurons 41, 42 may be in the same level, or may be in different levels of the neural structure. The depth or level of a neuron in a neural network structure is based on the number of steps required to express the elemental neurons that it represents.

The neural structure comprises neurons, where each neuron represents a memory of data, events, objects, concepts or actions. The type of information represented by each neuron can vary, and is dependent on the elemental neurons (representing sensor and/or motor neuron stimuli) from which the neural network is constructed. Elemental stimuli are only represented in the elemental neurons maintained at the root levels of every neural network structure. Deeper or subsequent level neurons (structural neurons) only represent the association of other neurons and do not in themselves store sensor, motor or elemental stimulus values.

Each neuron in the neural structure may represent the association of only two neurons, one an initiating neuron and the other an associated neuron, although each neuron may participate as an initiating neuron and/or as an associated neuron in an unlimited number of associations, via associating neurons. An initiating neuron 41 can have any number of successor neurons such as neuron 43, where a successor neuron to neuron 41 is a associating neuron (43) that has neuron 41 as its initiating neuron. Another neuron 42 can have any number of precessor neurons, where a precessor neuron to neuron 42 is a associating neuron (43) that has neuron 42 as its associated neuron. Thus, neuron 43 can be referred to as an associating neuron, or a successor neuron to neuron 41, or as a precessor neuron to neuron 42.

The association is by one of the elemental neurons 41, 42 being an initiating neuron and one is an associated neuron. Assuming neuron 41 is the initiating neuron and thus neuron 42 is the associated neuron, when neuron 41 is activated or fires associating neuron 43 is potentiated. At the same time as, or subsequent to neuron 41 firing neuron 42 is activated or fires and also potentiates associating neuron 43. Neuron 43 is then considered activated. If the associating neuron 43 was nonexistent (that is there existed no neuron associating the initiating neuron 41 and the associated neuron 42) then it is created and may be then activated, otherwise it is only activated. The proximal activation or firing of neurons 41 and 42 causes the activation of associating neuron 43, and the creation of active connections, or the strengthening of existing synaptic connections, between neurons 41 and 43 and neurons 42 and 43. The associating neuron 43 represents the sum of what is learnt from the other two neurons 41, 42. This sum may include one or more of a memory trace, a combination of the experience of the two, a sequence of events, a proximity of events and so forth. Once an associating neuron is activated or created to represent a desired memory or events, the desired memory or events need not be recreated in another neuron.

The definition of proximity or proximal activation or firing wilt be set by the rules of operation for each neural network. Proximity ("ΔP") may vary across a level, and across levels, and may vary according to the type of elemental neuron being represented. Neurons at deeper levels within the neural network are less likely to be in close proximity, thus it is likely that ΔP will increase. If ΔP represents time or temporal events ΔP may be as short as zero, milliseconds or seconds, or as long as minutes, hours, days or weeks. Events that occur simultaneously in the real world may still be represented temporally based on differences in synaptic activation or firing times or the length of dendritic firing paths. It may also vary according to the processing requirements of the memories or events being represented by the neural structure. ΔP may also represent spatial relations between objects or events and can also represent the topological spatial relationships of neurons in the brain.

A neural network according to the present invention consists of two basic elements:

1. Elemental neurons, which can represent elemental stimuli, sensor or motor neurons or such elemental data as required or desired. These are the elemental or root neurons from which a neural network is constructed. Different types of elemental neurons may be defined depending on the type of experience or events or information being represented. For example if representing the auditory cortex the elemental neurons would be for representing distinct sounds. Elemental neurons may incorporate a number of different types of elemental neurons such as, for example, one set for representing sound energy or intensity of the sound (volume), and another set for representing the frequency of the sound.

If representing smell and taste there may be a set of elemental neurons for taste and another set for olfactory sensing.

In vision there may be sets of elemental neurons to represent the color cones, rods, edges, contrast, movement, and so forth, as represented by the ganglion cells, or specifically to represent the photoreceptor neurons.

For skin receptors there may be elemental neurons corresponding to touch—mechanoreceptor neurons; temperature—thermo receptor neurons; pain—nociceptor neurons; and so forth. Motion can be represented by the various types of motor neurons that induce movement.

When a sensory neuron is activated or fires, it communicates to different areas of the brain via synapses or nerve cells that a certain form of energy from a specific cell or sensory organ at a specific location has been received. All sensory neurons have similar central processing mechanisms. When a motor neuron is activated or fired in the brain it induces muscle contraction at a specific location in the body thus producing movement. When a sensory neuron detects an event it passes the data to the brain where it is processed in the brain's neural structure.

Artificial elemental neurons may also be defined. For example, if using the neural structure to process English text, a set of elemental neurons may be defined to represent the alphabetic characters and punctuation characters. For the Chinese language, elemental neurons could be defined for each Chinese character, or a subset thereof. If using the neural structure to process protein sequences, the elemental neurons may be defined to represent the twenty amino acids, or subsets thereof. For speech, different motor neurons may be defined to produce different muscular contractions resulting in the production of sounds corresponding to phonemes, and so forth.

Elemental neurons can be initiating and associated neurons but cannot be a associating neuron.

2. Structural neurons representing the neural structure. The neural structure as illustrated in FIG. 4 consists of neurons that represent the association of other neurons, whether they are sensor neurons, motor neurons, or other structural neurons. In this manner neural structures can grow, representing more and more information.

Structural neurons can also be used to form associations between structural neurons representing different sets of elemental neurons. For example, an association may be formed between the English word "ball" represented by an association of alphabetic elemental neurons, with the shape "ball" represented by an association of visual elemental neurons. In this manner it is possible to build neural networks which allow the association of information across different cortexes or across different neural networks. Another association between the shape "ball" may exist with the spoken word "ball" represented by an association of motor neurons to enable phoneme neurons to produce the sound "ball".

Structural neurons are associated with each other on the basis of characteristics including temporal, spatial, intensity, magnitude and relative position. If representing speech with the neural structure, the associations would be of a temporal nature, representing the sequence of phonemes, words, phrases, clauses, and so forth, used in expressing speech. Likewise, if processing text or reading a book the processing of individual characters would be of a temporal nature building up the words, phrases, clauses, and so forth. Many neurons in the brain are also organized spatially or topographically, such as those for vision, hearing, touch, pain, and so forth. As such it is possible to construct neural structures that represent spatial characteristics. For example, in forming a neural structure representing a visual scene, neurons representing edges or lines or curves or objects or patterns may be associated into a neural structure that associates elemental neurons representing pixels into lines or curves based on proximity, near objects with far objects, or high objects with low objects, thus building a three dimensional map of the environment.

The same neural structure can be used to represent information in any of the four dimensions defined by space and time.

As above, the shape "ball"—represented by a spatial neural structure—may be associated with the spoken word "ball" represented by a temporal neural structure.

A structural neuron is an associating neuron. It can also be one or both of an initiating neuron and an associated neuron.

The combination of elemental neurons at the root levels of association within the neural structure allows for the creation of structural neurons that represent particular elemental features or characteristics within a cortex (neuronal assemblies). The neural structure allows for the representation of feature combinations by dynamic association within the neural structure. Neural activity in the neocortex that is evoked by sensory neurons is always distributed in the brain to different areas. In sensory systems, different areas of the brain can process different aspects (spatial/temporal/intensity/magnitude/relative position) of the same input stimuli. The proposed neural structure allows for intra-areal neural associations in order to represent coherent concepts/percepts and behavior. Deeper levels of association within the neural structure (intra cortico-cortical associations) allows for the representation of increasingly complex information or behavior.

Neurons may be organized, classified or named according to their functions, characteristics, levels, nature, and so forth. Neurons may also be defined for a particular dimension. That dimension may be time, distance, space, length, height, pitch, amplitude, or any other definable characteristic.

Within its particular dimension, any two neurons may be differentiated according to their relative or related occurrence, position, scale or magnitude. This relative positioning is represented by $\Delta P$.

The basic underlying parameter for constructing a neural network is that for any two active neurons A related to B by relative position there exists a third neuron C that has connections via synapses to both neurons A and B. If such a neuron does not exist then it is possible to create such a neuron and its connections. Therefore neuron C associates neurons A and B together maintaining their relative positions. A and B may be, but do not have to be, contiguous or consecutive within their relative positions. Therefore neuron C can associate any two neurons A and B which represent events whether the events are concurrent, contiguous, consecutive, non-contiguous, non-consecutive or overlapping.

The logic of the association is that for any two active neurons A and B that are activated or fire, one of them will be an initiating neuron. The third neuron C will associate the initiating neuron with the second neuron preserving their order of activation or firing. As such, neuron C represents the combined events of the initiating neural event followed by the second neural event. This new neuron C can subsequently participate in combining with other neurons (thus creating new associations), and so forth.

The basic rule for creating new neurons is that if neuron A is activated or fired, concurrent with or followed by neuron B being activated or fired, then a new neuron C can be constructed and possibly activated or fired, representing the association of neurons A and B (i.e., the association of events AB in time or space). If neuron C already exists due to a prior event or association then neuron C can Likewise be re-activated and fired, allowing it to participate in subsequent existing or new activations, thereby allowing it to form new associations. This allows for the construction of neural networks with an unlimited numbers of associations and/or relationships.

Figure 5:
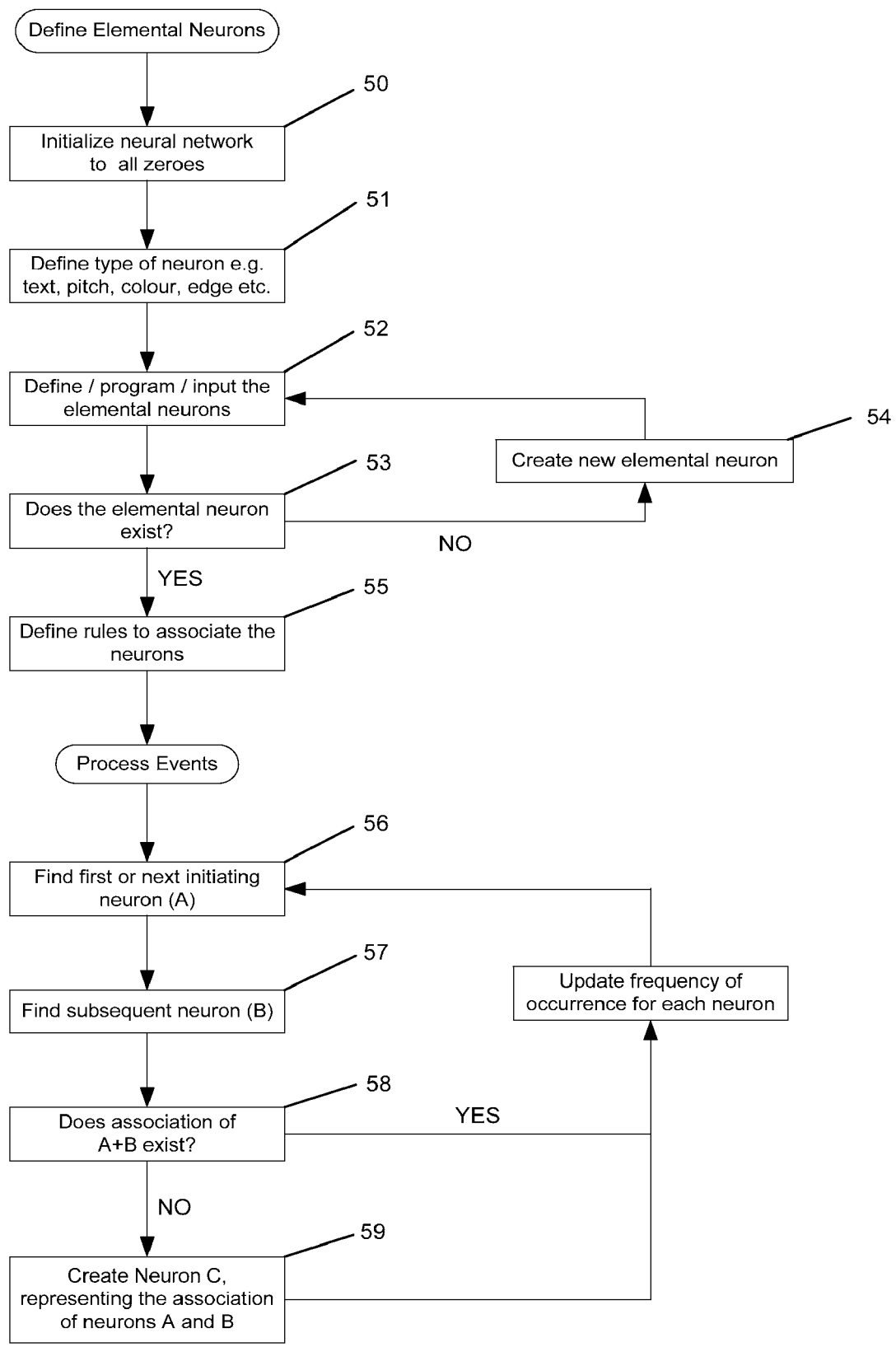
FIG. 5 is a flow chart of the process flow of the present invention.

A flowchart representing the basic flow for creating a new neural network is shown in FIG. 5. This preferred example shows the processing steps and application of the model for processing a simple sequence of elemental events.

In FIG. 5, the neural network or array representing the neural network is initialized at 50. At 51 the type or category of each elemental neuron is defined and may be related to, for example, text, vision pitch, color, edge, sound, volume, taste, olfactory sensing, color cones, rods, pain, contrast, movement, muscular movement, ganglion cells, photoreceptors, touch, mechanoreceptors, temperature, thermo-receptor, nociceptor, motion, language, characters, letters, words, and so forth.

The elemental neurons are then defined/programmed/input at 52. The question is then asked: does the elemental neuron already exist? (53). For each unique value to be represented for each defined type of defined elemental neuron, all elemental neurons must be created, and are attached as a list of successor neurons to the root neuron, the root neuron being represented by node zero in the array representing the neural network. If the answer to the query is no, a new elemental neuron is created (54) and the process returns to (52). If yes, the process continues to 55. Here, the rules to associate neurons is defined. Alternatively, new elemental neurons may be defined as and when they occur during the learning process.

The first, or next initiating, neuron is then found (56). This is designated neuron A. The subsequent neuron (neuron B) is then found (57). If an association of neuron A and neuron B already exists (58), the process reverts back to 56. If not, a neuron C is created as representing the association or combination of neuron A and neuron B (59) and the process reverts back to 56. Neuron C can be referred to in this process as the associating neuron.

Figure 8:
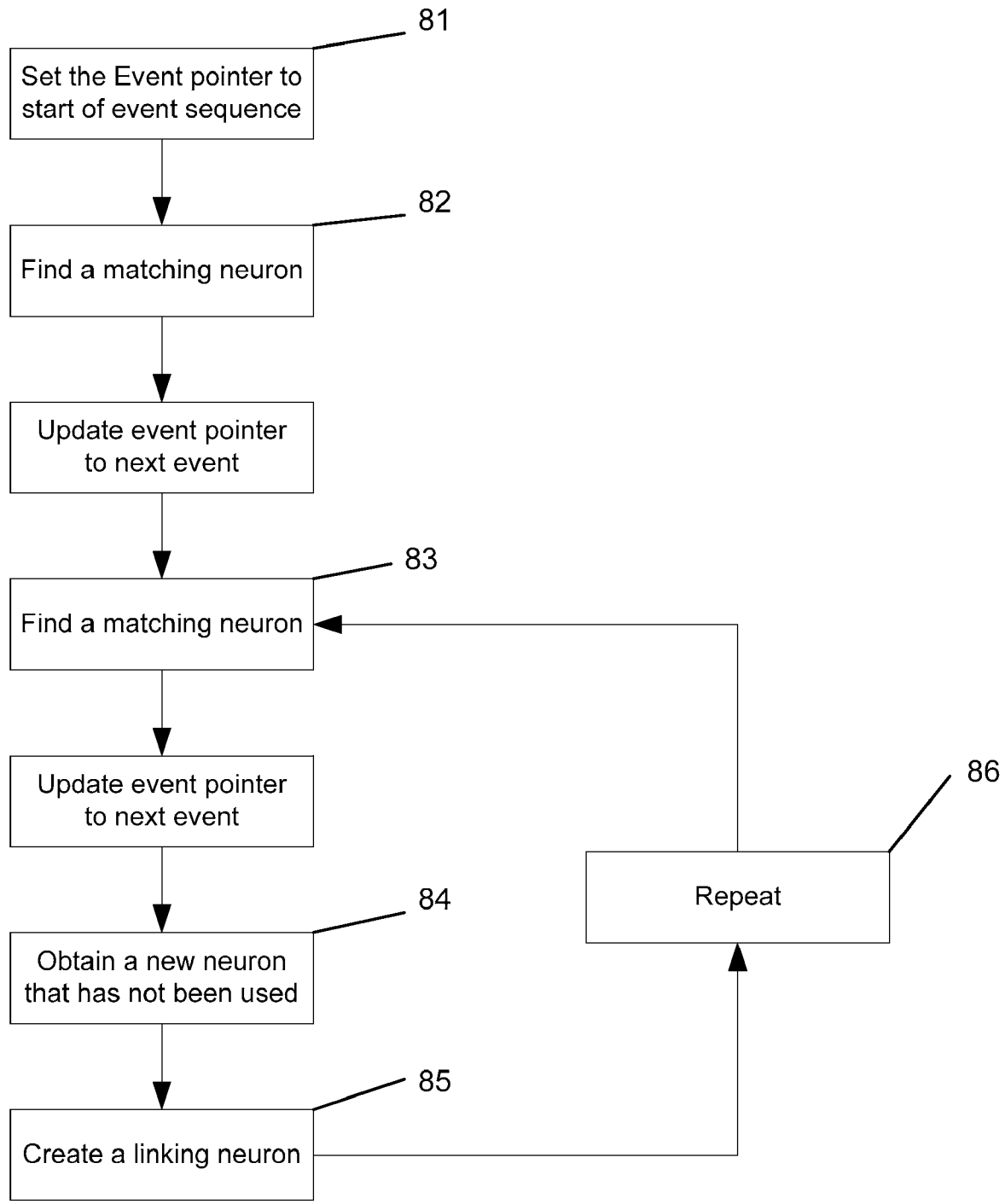
FIG. 8 is a flow chart for the learning process.

FIG. 8 is a flow chart providing more detail of steps 56 to 59 of FIG. 5. Here, neural processing or learning is of an experience represented by a pattern or sequence of elemental neuron events.

In step 81, the event pointer is set to the first elemental event in the event pattern or sequence. A matching neuron is found in step 82. The matching neuron is a neuron (memory) in the neural network that matches the leading event or events in the pattern or sequence of events pointed to by the event pointer. This matching neuron is defined as the initiating neuron (neuron A). The event pointer is then updated according to the defined rules for the neural network to point to the next event.

Another matching neuron is then found in step 83. Again, this neuron (memory) is for the event or events in the pattern or sequence of events pointed to by the event pointer. This another matching neuron is defined as the associated neuron (neuron B). The event pointer is then updated according to the defined rules for the neural network to point to the next event. In this manner new associating neurons or associations are always created, subject to any rules to the contrary. Generally the neuron C could not have previously existed, otherwise it would have been matched at step 82.

Having completed the processing of a single pass, the same data or event sequence may be processed again if so desired, extending the neural network structure accordingly.

A further neuron that has not been used is then found in step 84. This is created as the associating neuron (neuron C) in step 85. The process of steps 82 to 85 are repeated in 86 until there are no more events in the pattern or sequence of events being processed.

Figure 9:
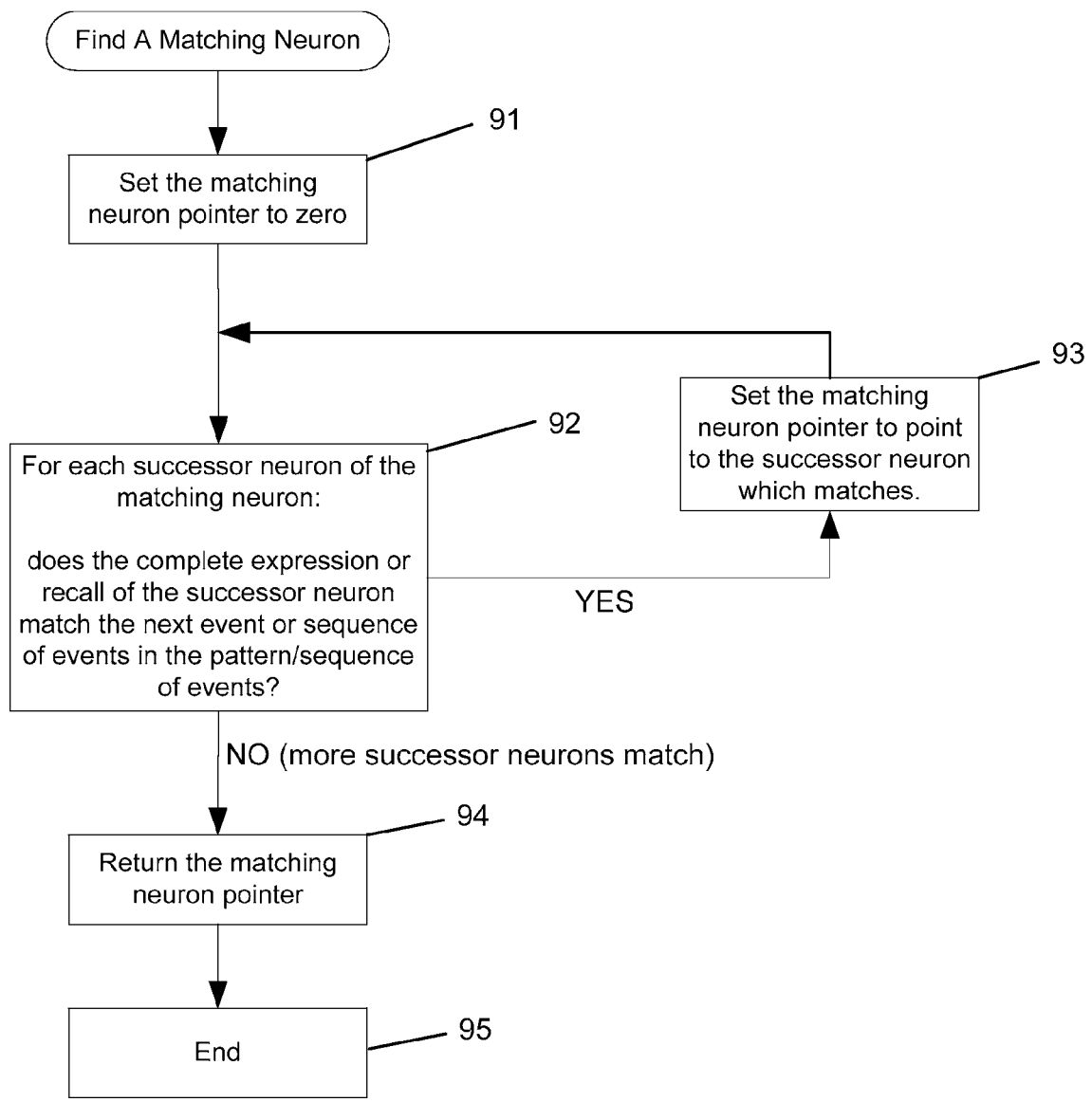
FIG. 9 is a flow chart for the matching process.

FIG. 9 provides more detail of the process steps 82 and 83 of FIG. 8—the finding of a matching neuron.

In step 91 the matching neuron pointer is set to zero by pointing to the root neuron. For each successor neuron of the matching neuron (step 91), a check is conducted to determine if the complete expression of the successor neuron matches the subsequent event or events or sequence in the pattern or sequence of events being processed. If it does, the process moves to step 93 where the pointer for the matching neuron is set to point to the successor neuron that matches the event pattern or sequence. In addition, the event pointer may be adjusted to point to the remainder of the pattern or sequence of events that, as yet, have not been matched. The process then reverts to step 92 and continues. If the result of step 92 is that it does not match, in step 94 the matching neuron pointer is returned pointing to the last matching neuron, and the process ends in step 95.

Figure 10:
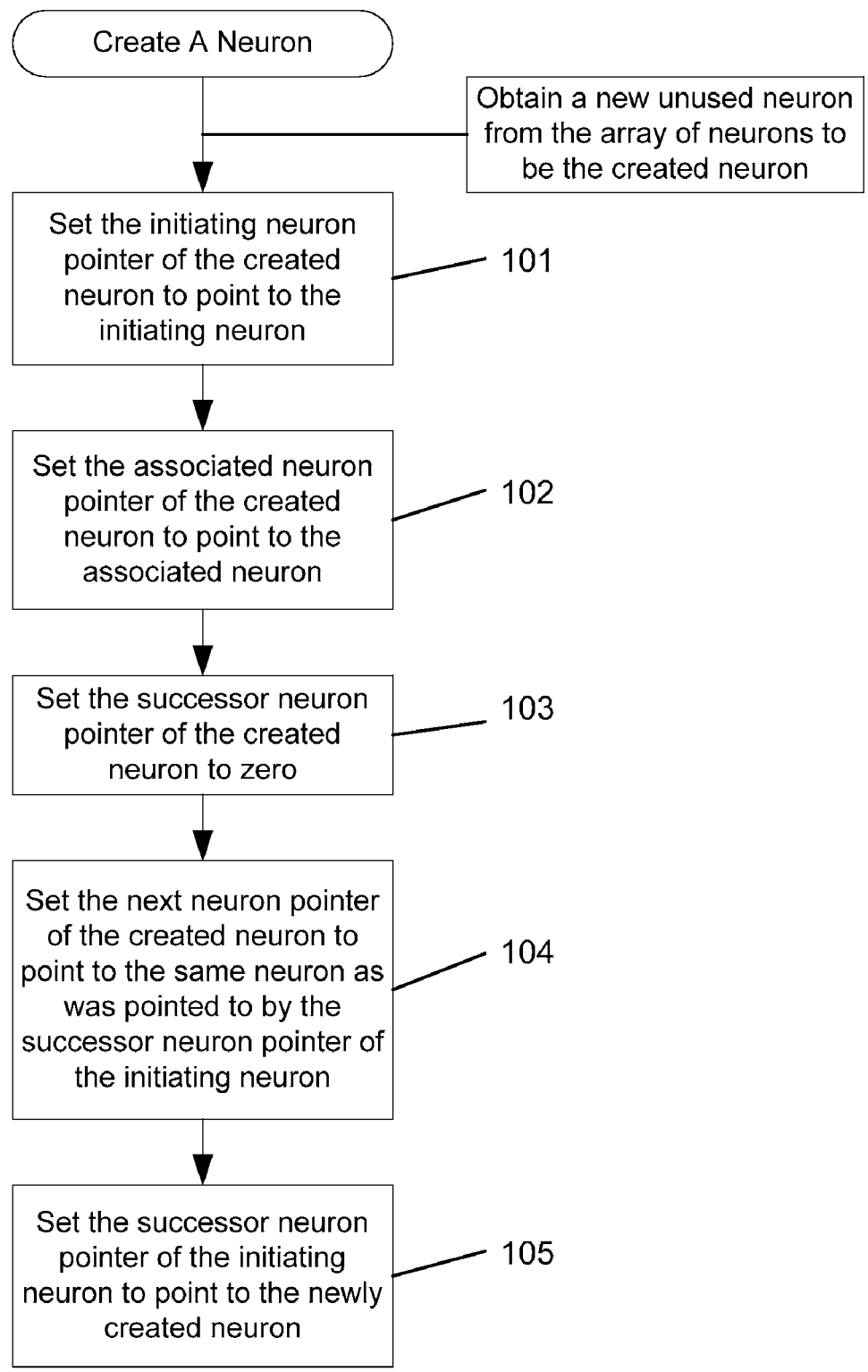
FIG. 10 is a flow chart for creating neurons during the learning process.

FIG. 10 illustrates in more detail the process of step 85 in FIG. 8—the creation of an associating neuron. In step 101, the initiating pointer of the associating neuron is set to the point to the initiating neuron, and in step 102 the associated neuron pointer of the associating neuron is set to the associated neuron. As the associating neuron has no successor neurons (having been just activated or created), its successor neuron pointer is set to zero (step 103). The next neuron pointer of the associating neuron is then set to be equal to the successor neuron pointer of the initiating neuron. Finally, in step 105, the successor pointer of the initiating neuron is set to point to the associating neuron and thus the associating neuron becomes the first entry in the list of successor neurons to the initiating neuron.

A group of elemental neurons representing a common characteristic may be organized into a cortex. Thus, it is possible to have a visual cortex containing groups of neurons which relate to a first visual characteristic (for example, a group of neurons for color); a second group for second visual characteristic (for example, shape); a third group for a third visual characteristic (for example, size), and so forth. Structural neurons from one neural network, representing distinct patterns or events, can be elemental neurons in another neural network. Multiple cortexes, possibly represented by multiple neural networks (and the neurons within them), may be interlinked and related to form an integrated 'brain' which can provide not only an integrated learning environment, but also the potential for intelligent behavior.

Traditional neural networks are typically unidirectional. This means that, given a certain input the output can be derived. However, they cannot work in the reverse direction. That is, given the output, it is not possible to derive the input.

The present invention provides for the capability for 'expression', whereby the sequence of events that leads to the construction of any neuron can be expressed. The importance of expression is that it allows a complete sequence of events to be represented by a single neuron, and that sequence can be reproduced by activating that single neuron and, in turn, the neurons that represent the association that is the initiating neuron and the associated neuron in the same relative position or order in which they were created, and so forth. In this manner it is possible for a single neuron representing a complete experience or memory (sequence of events) to be expressed, recalling the experience.

The expression ability is implemented by way of the initiating pointer and the associated pointer for each neuron in the neural structure.

Figure 11:
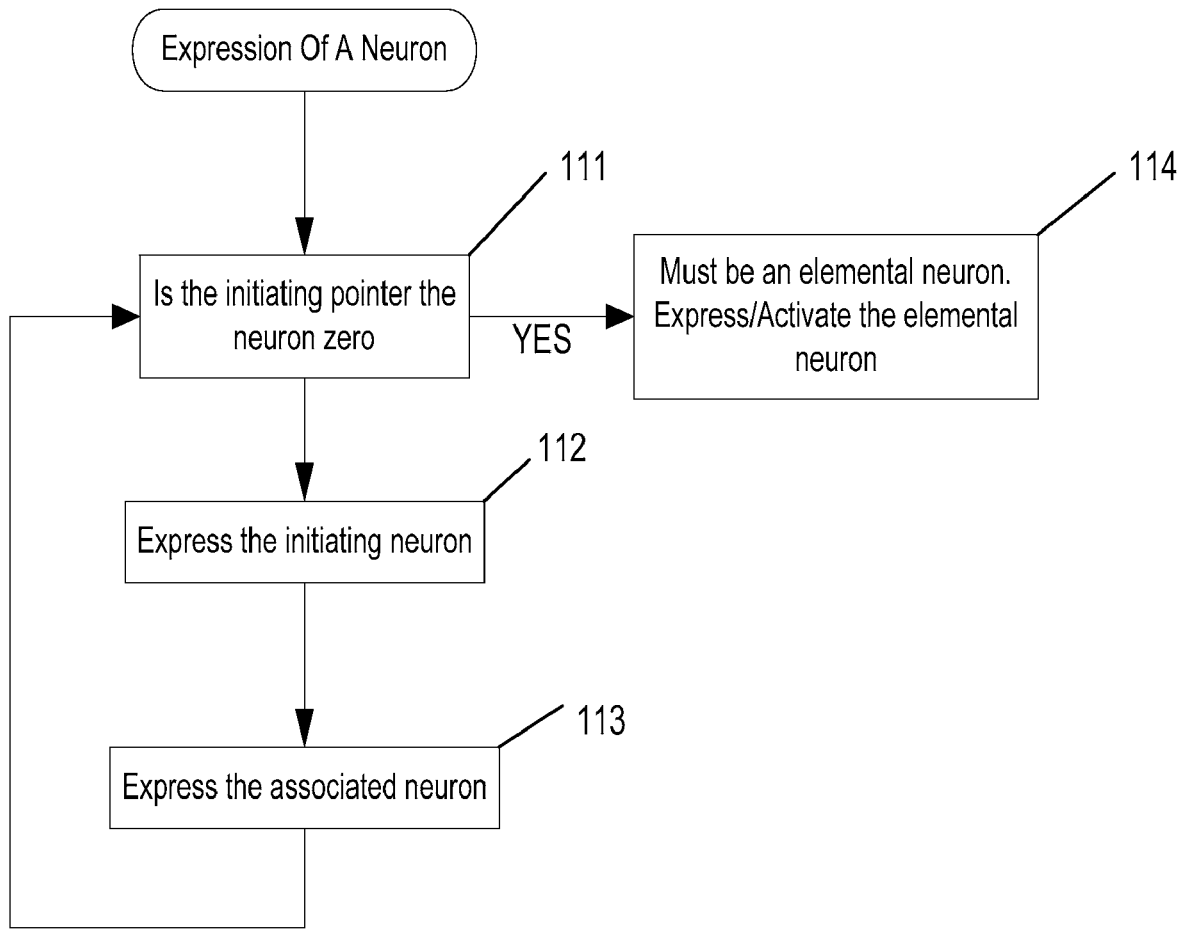
FIG. 11 is a flow chart of the process for expressing of neurons.

Expression is illustrated in FIG. 11. When expression is required, the first check in step 111 is to determine if the initiating pointer of the neuron to be expressed is equal to zero. If yes, it must be an elemental neuron and the process reverts to step 114 where expression is activation of the element event or value stored in the associated neuron to represent the elemental neuron. If the value is not zero, step 112 is started. In step 112 is expression of the neuron pointed to by the initiating neuron pointer of the neuron to be expressed. In step 113 is expression of the neuron pointed to by the associated neuron pointer of the neuron to be expressed. This continues until all elemental neurons representing the memory have been expressed.

Each neuron in the network has an address to identify its location within an addressable array of nodes where each node represents a single neuron. All neuron pointers refer to an address of a node representing a single neuron in the array of neurons. The bit size of the address or pointer will influence the maximum number of neurons possible to be represented in the array representing the neural network. For example: using a pointer address size of 32 bits will allow the construction of neural networks consisting of $2^{32}$ or 4,294,967,296 neurons.

Each neuron is represented by a single fixed length node in a conventional array or structure. The number of neurons that may be stored in an array will be dependent on the total memory storage available (internal and/or external), and on the pointer address architecture:

(a) a 16 bit pointer address architecture will allow for up to $2^{16}$ neurons. This is $6.4 \times 10^3$ neurons;

(b) a 32 bit pointer address architecture will allow for up to $2^{32}$ neurons. This is $4.1 \times 10^9$ neurons;

(c) a 48 bit pointer address architecture will allow for up to $2^{48}$ neurons. This is $2.7 \times 10^{14}$ neurons; and (d) a 64 bit pointer address architecture will allow for up to $2^{64}$ neurons. This is $1.8 \times 10^{19}$ neurons.

As the human brain has approximately $10^{12}$ neurons, it may be possible match the capacity of a hundred human brains using a 48 bit pointer address architecture. Based on the latest computers that support 64 bit addressing, it may be possible to have the capacity to represent neural structures consisting of $10^{19}$ neurons, the equivalent size of 10 million human brains wired together.

To represent the neural network, a node will consist of a minimum of four pointers. Each pointer contains an address to another neuron. As explained above, using an address size of 32 bits will allow the construction of neural networks consisting of up to $2^{32}$ or 4 billion, neurons.

Figure 6:
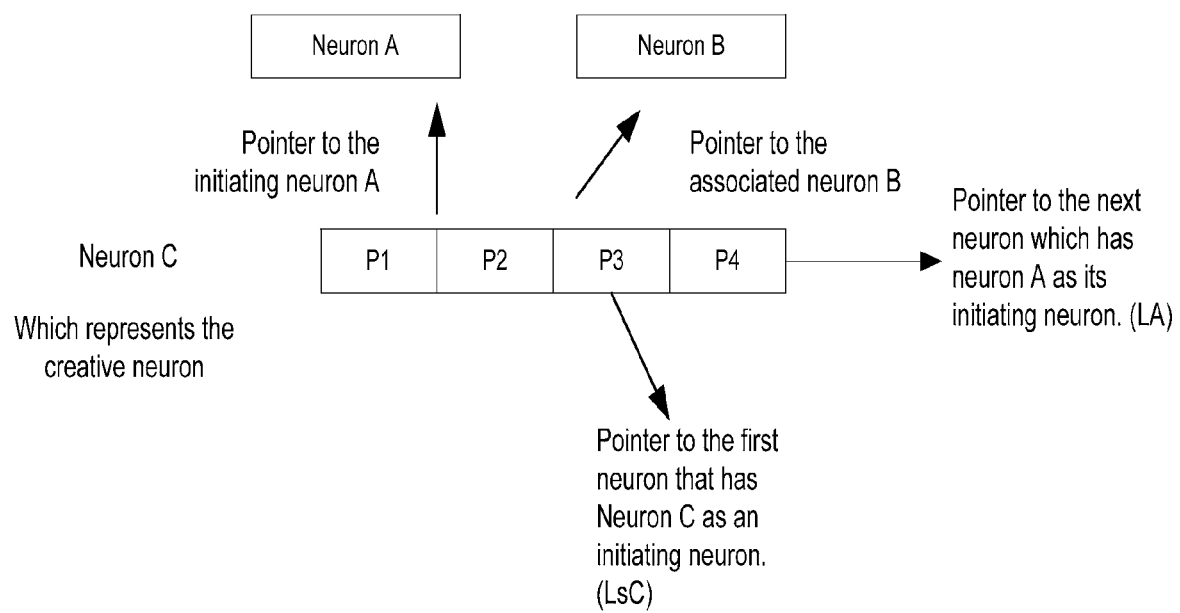
FIG. 6 is an illustration of the relationship between neurons and pointers/links.

As shown In FIG. 6, each neuron may be represented by four pointers/links ($P_1$, $P_2$, $P_3$ and $P_4$), in the most basic implementation. Each pointer is a link to the address or location of another neuron. Typically, a neuron will have four pointers, the minimum needed to create an intelligent neural network with expression capabilities. However, a neuron may have more than four pointers, to provide additional functionality. For example in creating neuron C to represent the association of an initiating neuron A and an associated neuron B, the following pointers are required for neuron C:

P1—a pointer to the initiating neuron, i.e., neuron A;

P2—a pointer to the other neuron that participates in forming the association, i.e., neuron B;

P3—a pointer to a list (LsC) of deeper level neurons that has neuron C as an initiating neuron (a successor pointer for neuron C); and P4—a pointer to the next neuron, (LA) that has neuron A as its initiating neuron (a 'next successor' pointer for neuron A).

Additional pointers can also be defined for neuron C if necessary to provide information on the precessors to the associated neuron. For example:

P5—a pointer to a list (LpC) of deeper level neurons that has neuron C as an associated neuron (a precessor pointer); and P6—a pointer to the next neuron in a list (LB) that has neuron B as its associated neuron (a 'next precessor' pointer).

Deeper level neurons may represent complex sequences of events. Since each structural neuron has at least one initiating neuron, and one associated neuron, a single neuron at level 10 may represent a sequence of up to $2_{10}$ or 1,024 elemental events. It is not a necessary condition that neurons can only associate with neurons of the same level.

Thus, in storing new sequences of events it is only necessary to identify those existing neurons which represent existing event sequences in the event stream and associate these together by constructing new neurons, e.g., if we have two event sequences of say 1,024 events and 512 events, respectively, it is possible to construct a single, new neuron to represent an event sequence of 1,536 events. Thus new sequence/event information can be economically represented in the neural network.

This is illustrated in FIG. 7. FIG. 7 is an illustration of a possible neural network derived from processing text and learning, for the sentence; "The cat sat on the mat." An arrowed line indicates the connection between an initiating neuron and a associating neuron, and a circled line indicates a connection between the associated neuron and the associating neuron.

Figure 7A:
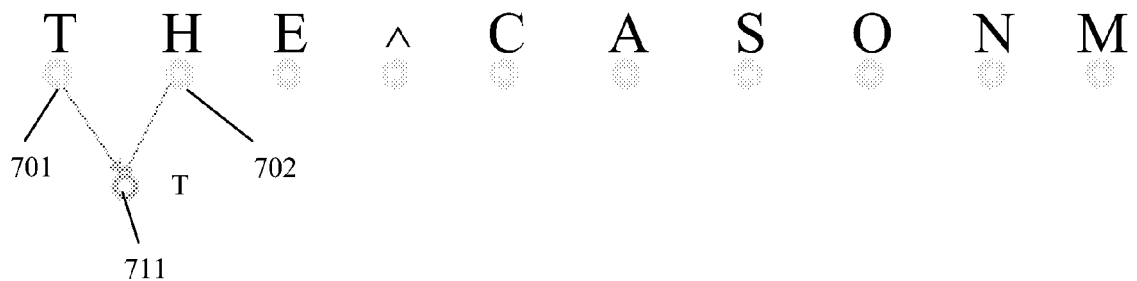
FIG. 7 is an illustration of a sequence of events to illustrate association.

In FIG. 7(a), the first elemental neuron 701 and the second elemental neuron 702 in level zero recognize or represent the letters "T" and "H" and associate to form the letter combination "TH" represented by the associating neuron 711 in level 1.

Figure 7B:
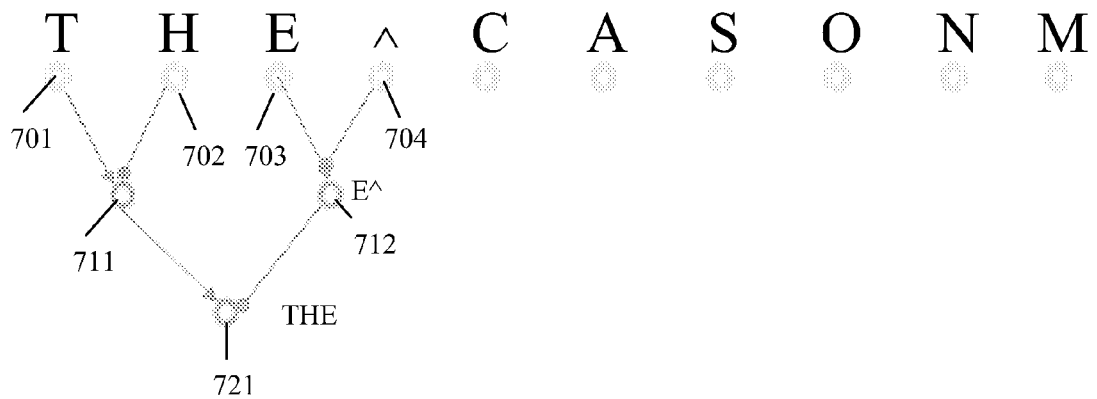

FIG. 7(b) shows the third elemental neuron 703 recognizing the letter "E" and the fourth elemental neuron 704 recognizing the space "^". These two associate together to form the combination "E^" represented by associating neuron 712 in level 1. The structural neurons 711 and 712 in level 1 associate to form the distinct word "THE ^" 0 represented by the associating neuron 721.

Figure 7C:
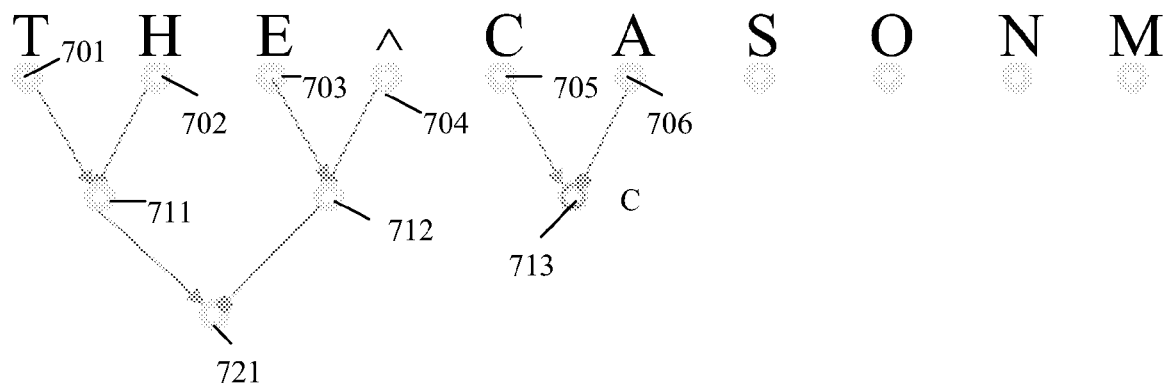
Figure 7D:
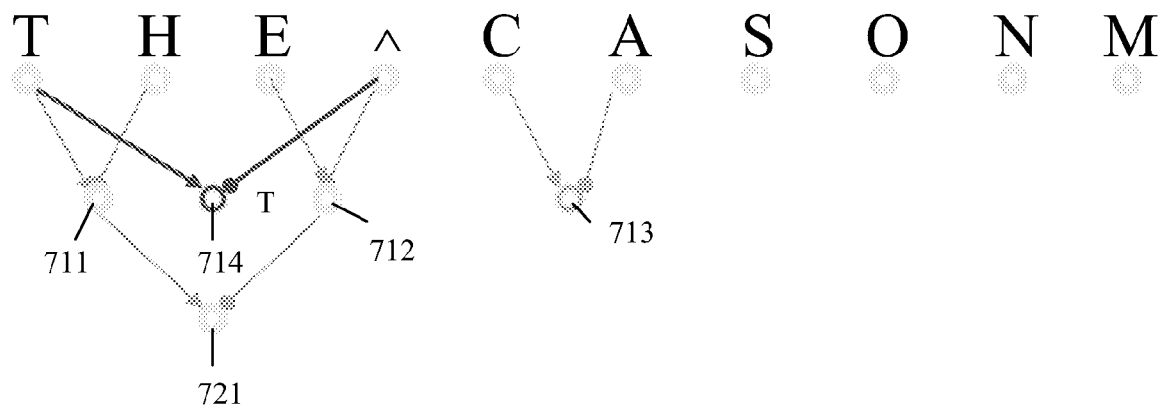
Figure 7E:
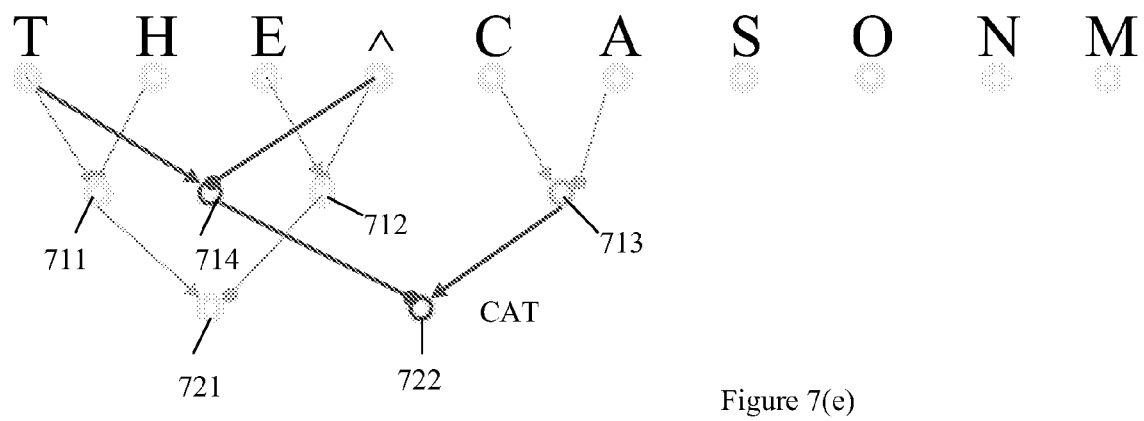
Figure 7F:
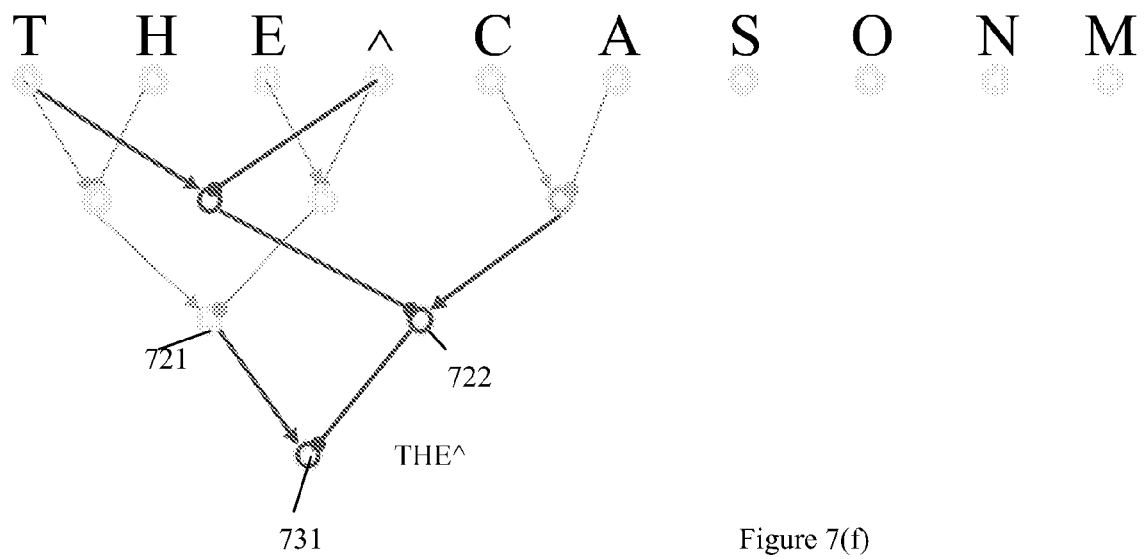
Figure 7G:
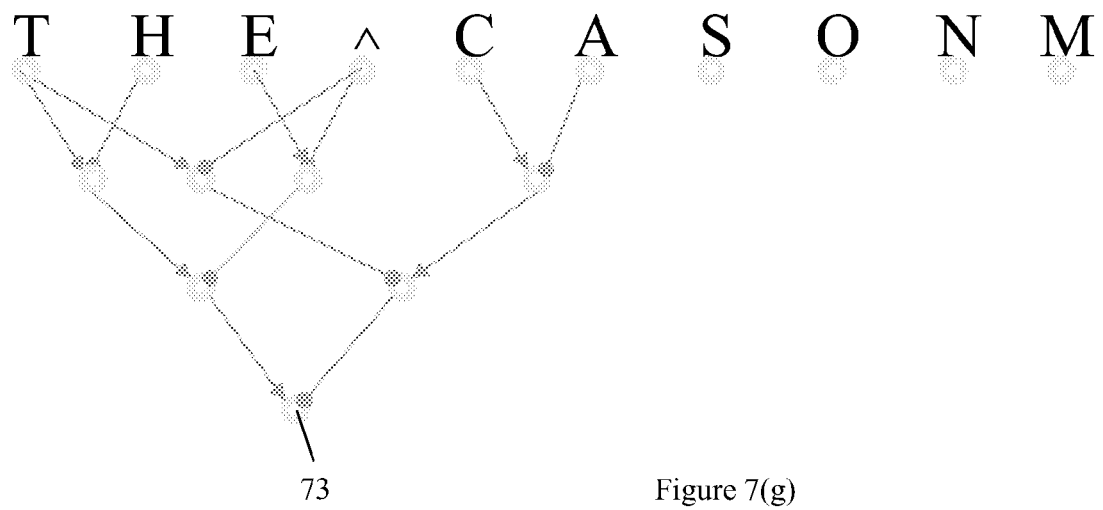

In FIGS. 7(c), (d) and (e), the next two elemental neurons In level zero—705 and 706—recognize the letters "C" and "A" respectively, and associate to form the letter combination "CA" represented by associating neuron 713 in level 1.

For the letters "T" and "^", neuron 701 associates with neuron 704 to create a associating neuron 714 in level 1 representing the combination "T^". Neurons 714 and 713 then associate to create a associating neuron 722 in level 2 thus forming the distinct word "CAT^" (FIG. 7(e)). Neurons 721 and 722 can then associate to give a result at the associating neuron 731 in level 3 to form the phrase "THE^CAT^" (FIGS. 7(f) and 7(g)).

Figure 7H:
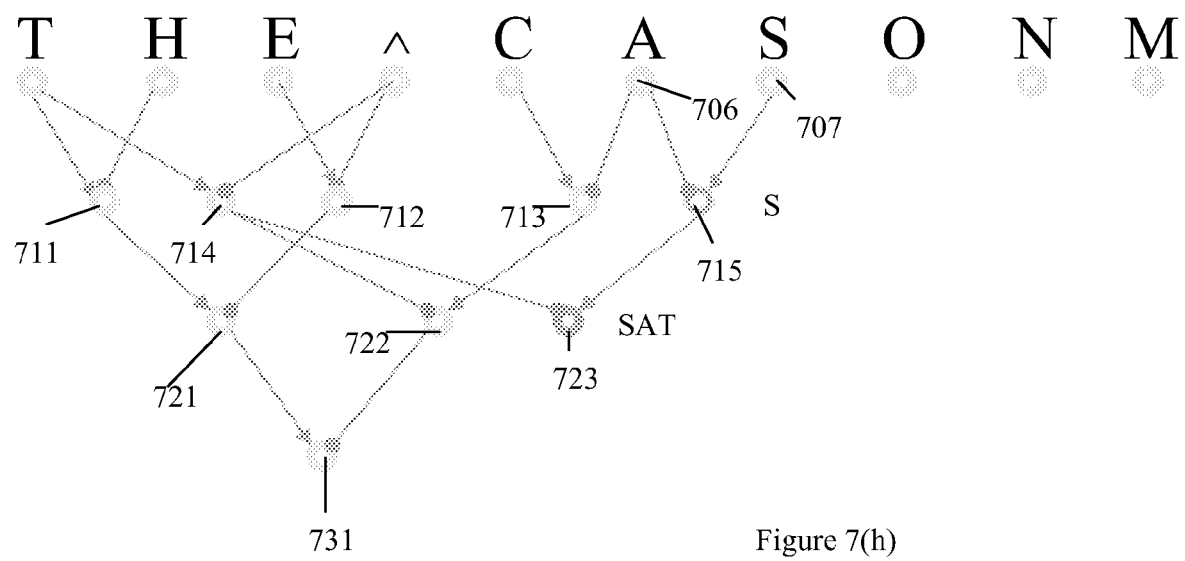

For the word "SAT^", as is shown in FIG. 7(h), neuron 707 recognizes the letter "S" and associates with neuron 706 to give a result at associating neuron 715 in level 1 for the letter combination "SA". Neuron 715 associates with neuron 714 in level 1 ("T^") to give a result at associating neuron 723 in level 2 for the distinct word "SAT^".

Figure 7I:
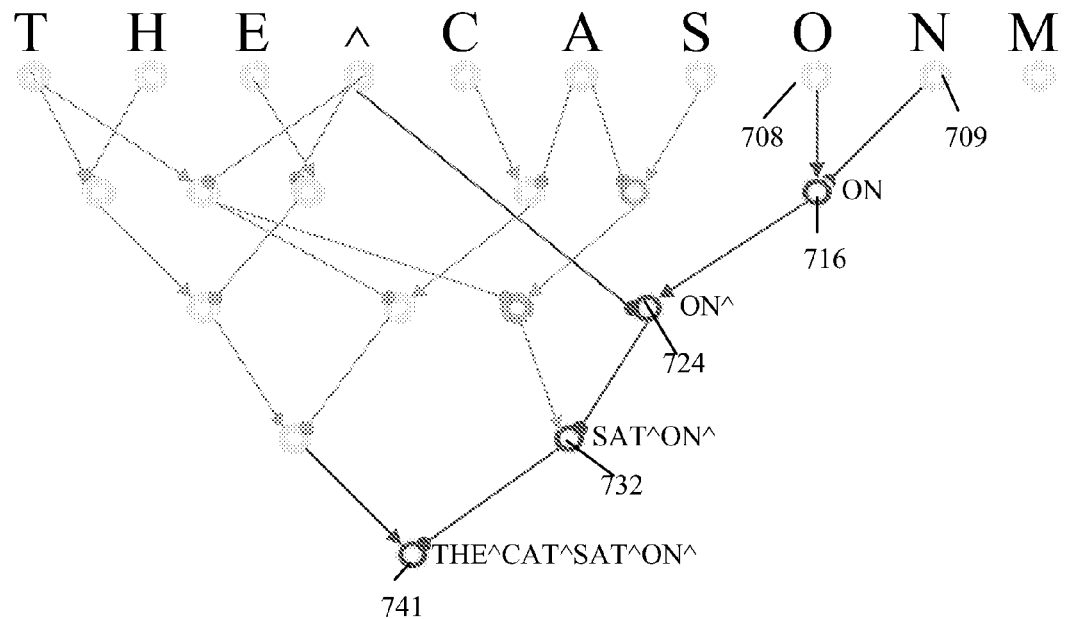
Figure 7J:
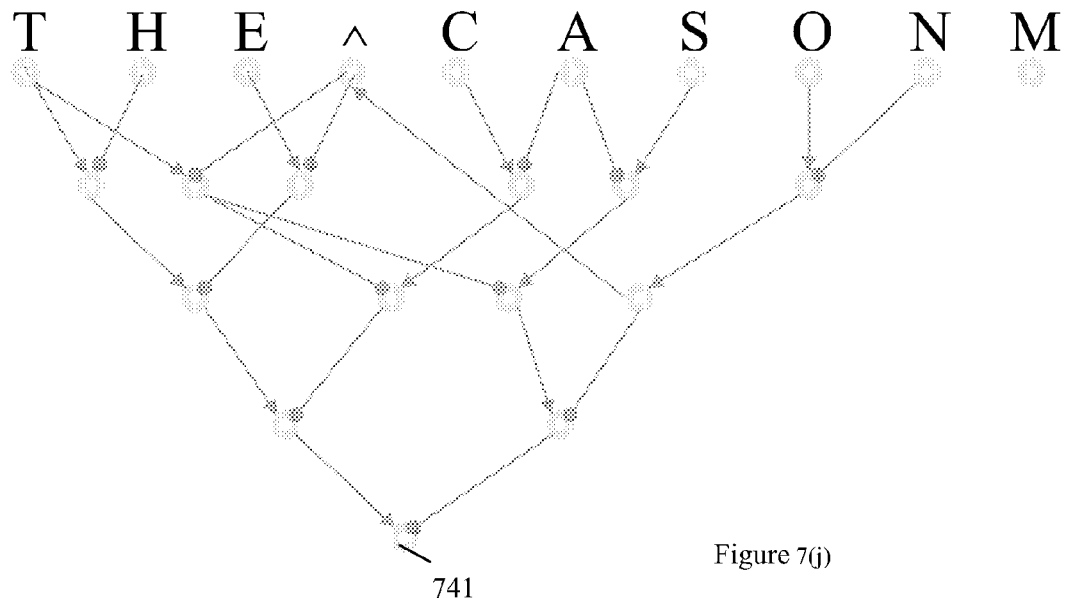

In FIGS. 7(i) and 7(j), neurons 708 and 709 recognize the letters "O" and "N" respectively and associate to form the letter combination (and word) "ON" represented by associating neuron 716 in level 1. Neuron 716 associates with neuron 704 to give a result at associating neuron 724 in level 2 for the distinct word "ON^". Neuron 723 in level 2 associates with neuron 724 to give a result at associating neuron 732 in level 3 for the clause "SAT^ON". Neurons 731 and 732 in level 3 may associate to give a result at neuron 741 in level 4 for the clause "THE^CAT^SAT^ON".

Figure 7K:
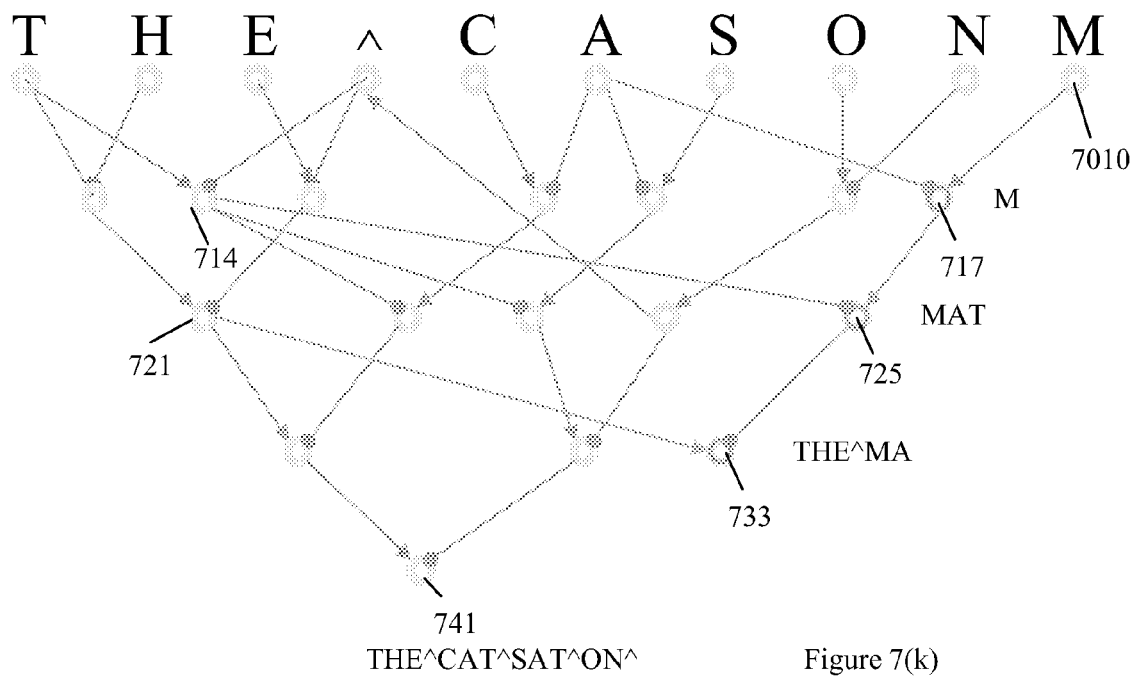
Figure 7L:
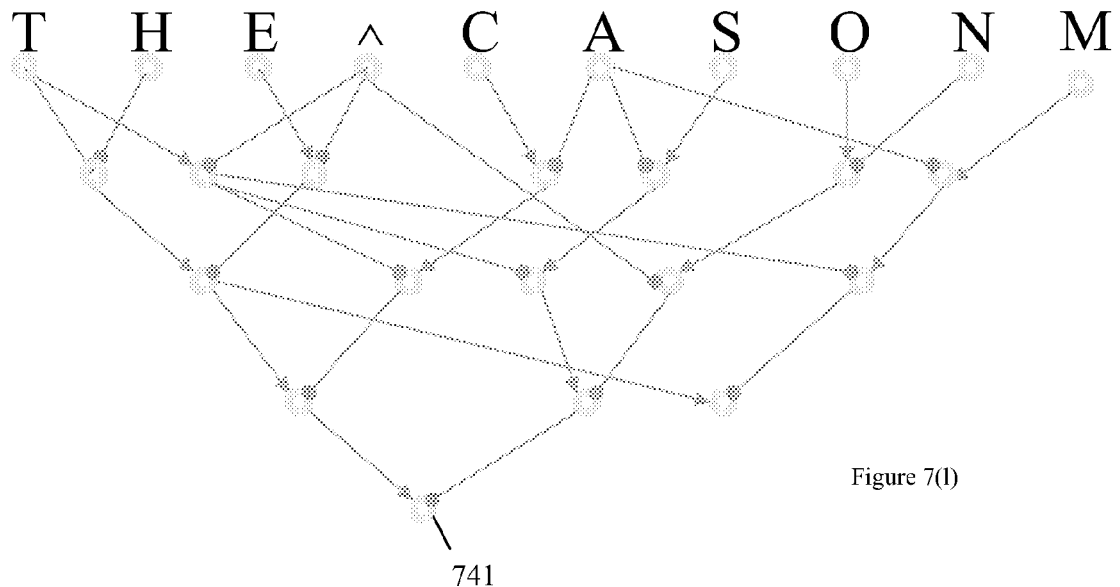

FIGS. 7(k) and (l) Illustrate neuron 7010 recognizing the letter "M" and associating with neuron 706 to give a result at neuron 717 in level 1 for the letter combination "MA". Neuron 717 associates with neuron 712 ("T^") to give a result at neuron 725 for the distinct word "MAT^". Neuron 721 associates with neuron 725 ("THE^") to give a result at neuron 733 for the phrase "THE^MAT^".

Neurons 741 and 733 can associate to give a result at neuron 751 in level 5 for the sentence "THE^CAT^SAT^ON^THE^MAT". It is clear that each associating neuron has at most one initiating neuron and one associated neuron. However, neurons can have multiple successor and precessor neurons. For example elemental neuron 701 "T" has successor neurons representing "TH" (711) and representing "T^" (714). Elemental neuron 706 "A" has three precessor neurons representing "CA" (713), "SA" (715) and "MA" (717).

Figure 7M:
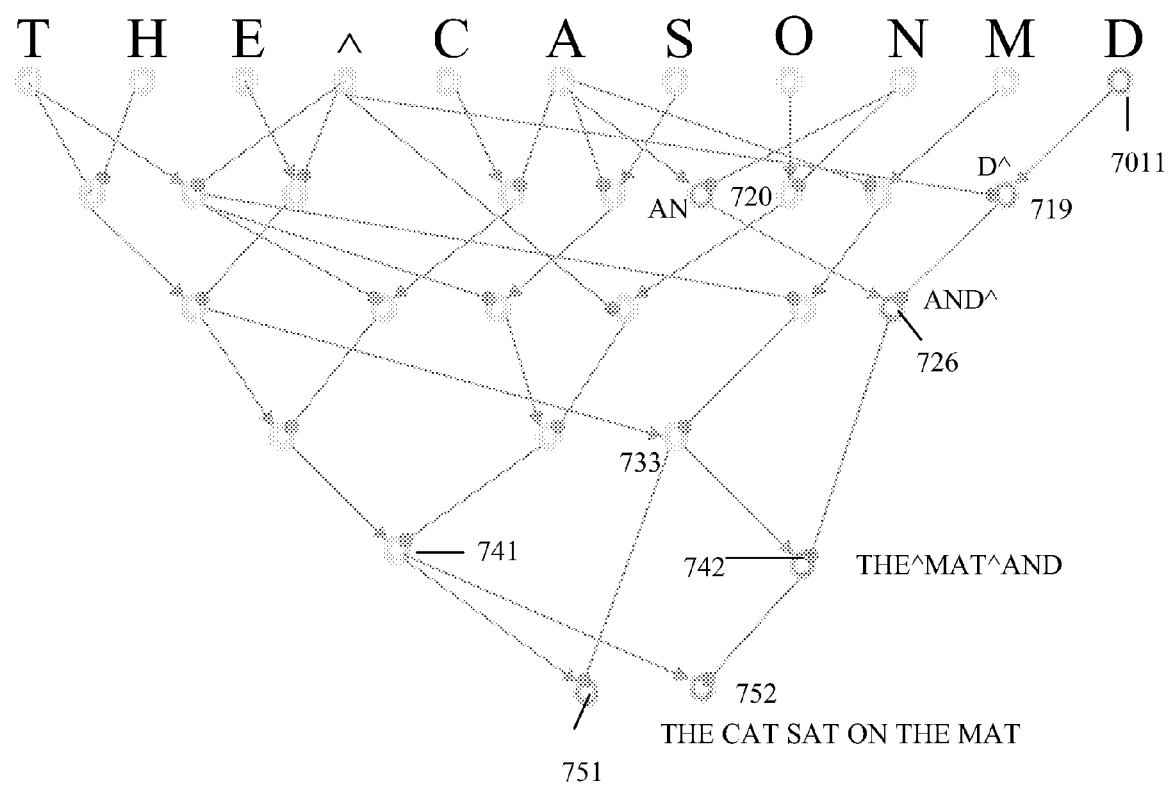

To extend the sentence illustrated in FIG. 7(m) where the neuron 7011 in level 0 recognizes the letter "D". Neuron 7011 associates with neuron 704 to give a result at neuron 719 for the combination "D^". Neuron 706 associates with neuron 709 to give a result at neuron 720 for the combination "AN". Neuron 720 associates with neuron 719 to give a result at neuron 726 for the combination "AND^". Neuron 733 associates with neuron 726 to give a result at neuron 742 for the combination "THE^MAT^AND^". Neurons 741 and 742 may the associate to give a result at neuron 752 for the combination to represent the phrase "THE^CAT^SAT^ON^THE^MAT^AND^"

Figure 7N:
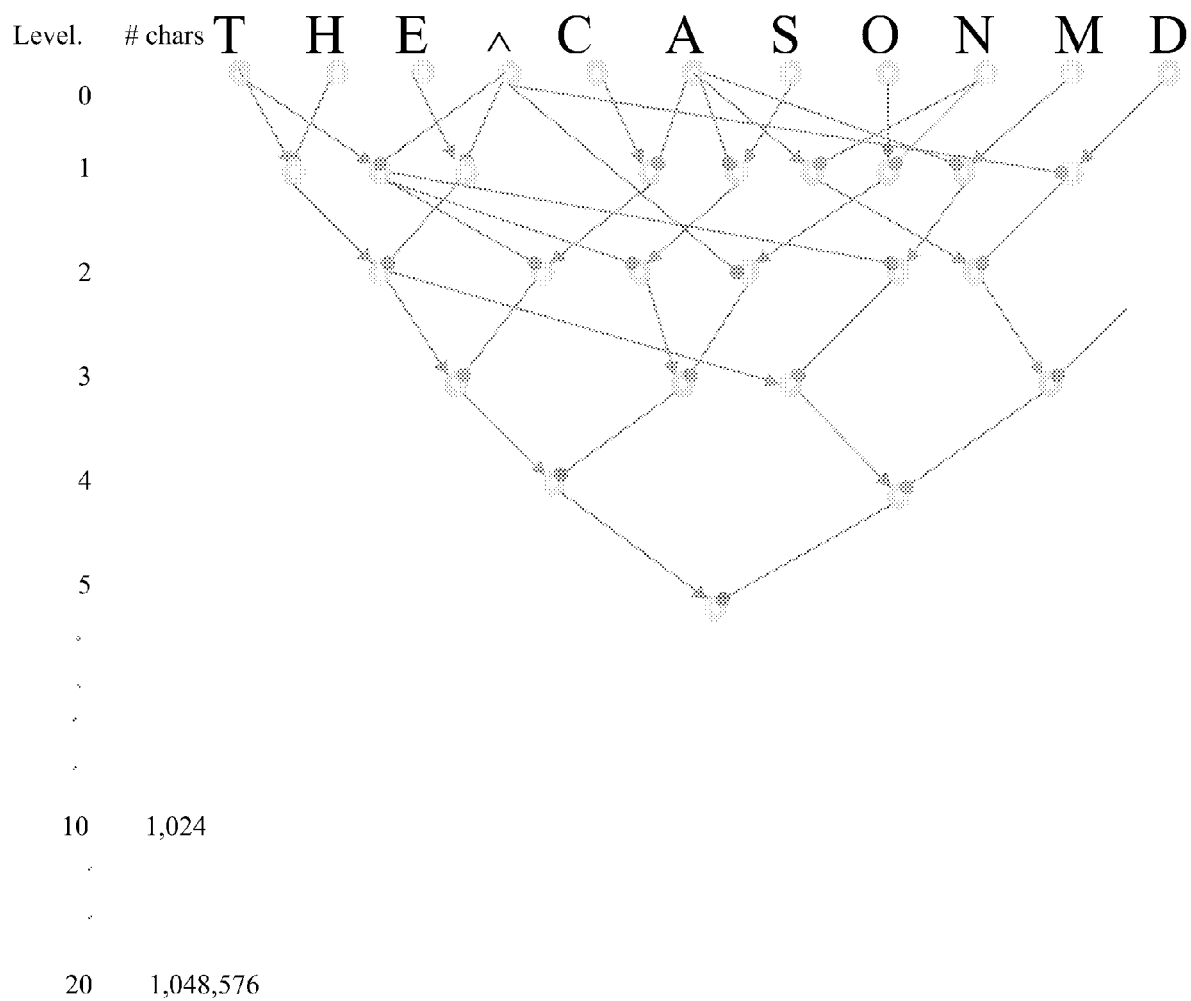

In FIG. 7(n) it shows that in level 0 each elemental neuron represents only 1 letter/character. Each neuron in level 1 represents an association of 2 letters/characters; in level 2 each neuron may represents an association of up to 4 letters/characters; in level 3 up to 8 letters characters; up to 16 letters/characters in level 4; up to 32 letters/characters in level 5; and so forth in multiples of 2 until each neuron in level 10 could represent the association of up to 1,024 letters/characters; and each neuron in level 20 could represent the association of up to 1,048,576 elemental events.

As can be seen, for text recognition the number of elemental neurons required is quite limited. One elemental neuron would be required for each of:

1. the 26 letters of the alphabet upper case;
2. the 26 letters of the alphabet lower case;
3. the 10 numbers;
4. the 32 punctuation and similar characters on the standard alphanumeric keyboard;
5. any other special characters (e.g., from the Greek alphabet) that may be required.

The number of structural neurons required and the number of levels of structured neurons required can grow in consequence of use of the neural network, during the learning process. Using the example of text recognition, the number of documents concerned, the size of the learning event(s) concerned, the use of language in the documents, and the maximum possible number of words, phrases, clauses, sentences, paragraphs, chapters, books, and so forth will impact the size of the resulting neural network structure. By way of example, if all the plays of William Shakespeare were recorded using the present invention in text recognition, after the first play was recorded there would be a certain number of structural neurons "N1". When the second play was recorded, within the same neural network, the total neurons required would not be the simple arithmetic sum of those required for the independent processing of each of the plays. Only the extra neurons required to process the second play above and beyond those created for the first play would be added to N1 to give the enlarged total N2. Neurons for any previously existing letters, words, phrases, clauses, sentences (and so forth) would not be added, but their new associations would be added. Upon the third play being recorded, the extra neurons required would be added in the same way to give N3.

By the time the final play was entered, the increase in the number of neurons required would not be great. The main increase would be at deeper levels in the neuron structure where new associations would be added. The deepest level could be a single neuron having all associations required to represent in their entirety all the plays.

As each neuron in each level can associate with any other neuron in any level to give a result at a third neuron, the number of potential permutations and combinations available is very large.

From a consideration of FIG. 7, there are different combinations that may be used to provide the result at neuron 751 "THE^CAT^SAT^ON^THE^MAT". For example, in level 1 as illustrated the following combinations are recorded:

"TH", "E^", "CA", "T^", "SA", "ON", and "MA".

Other combinations are possible. For example:

"TH", "HE", "E^", "CA", "AT", "T^", "ON", "N^", and "MA".

This can be followed by a further range of possible combinations in level 2. By adopting rules pertinent to a desired objective for using the neural network, to reduce or eliminate combinations, efficiency may be enhanced.

If a level 10 neuron is considered, it is capable of representing a sequence of up to 1,024 elementary events. The first element can be expressed by following the pointers up to the elemental or root level. This allows a relatively speedy expression.

Elemental neurons may be frequently activated both for learning and during expression. In a pure binary implementation two elemental neurons or root level neurons can be expressed or associated by a single level 1 neuron. Two level 1 neurons may be expressed or associated by a level 2 neuron and so forth. If a sequence of 1,024 elementary events is activated and learnt/expressed by the network then the following number of neurons at each level may be processed:

| | |
|---|---|
| 1,024 | level 0 |
| 512 | level 1 |
| 256 | level 2 |
| 128 | level 3 |
| 64 | level 4 |
| 32 | level 5 |
| 16 | level 6 |
| 8 | level 7 |
| 4 | level 8 |

-continued

| | |
|---|---|
| 2 | level 9 |
| 1 | level 10 | representing the entire sequence of elementary events.

If the basic time between neurons firing was 1 millisecond, at the root level, a level 10 neuron would only activated or fired once every 1024 milliseconds or once a second. Thus if the array representing the neural structure is represented as a combination of distinct memory blocks/areas, deeper level neurons could be stored in slower storage/memory area without impacting the performance of learning and expression.

In the preferred neural network structure, elemental neurons have as their initiating neuron the root neuron for the neural network structure. This allows an unlimited number of elemental neurons to be created on the fly, rather than having to predefine elemental neurons. Alternatively, elemental neurons can be allocated a predetermined neural storage/memory area in the structure, and each elemental neuron can then be directly addressed (e.g., for ASCII text characters 8 bits), 256 elemental neuron addresses can be pre-allocated (0 to 255) and the address of the first structural neuron will be at address 256.

In the preferred mode, new elemental neurons can be added at anytime, anywhere in the neural structure, providing for complete flexibility. When using a predefined area for the elemental neurons, processing may be faster as there is no need to search a list of successors attached to the root neuron.

Elemental neurons may be represented with their initiating neuron pointer set to zero—pointing to the root neuron (whether it exists or not), and their associated neuron pointer set to the value of the elemental event to be represented by that elemental neuron. A elemental neuron can always be determined or identified easily as its initiating neuron value is always zero. Therefore, when expressing neurons it is easy to determine when we have reached an elemental neuron because the initiating neuron value is zero, pointing to the root neuron. Alternative methods may be used to define elemental neurons, without impacting the essence of the neural network presented.

In the preferred mode, new successor neurons to an Initiating neuron are simply added to the front of the list. Therefore, they are attached directly to the initiating neuron. In this way recent memory traces are readily expressed.

However, various options are available to maintain lists of successor neurons. The neural structure allows this feature to be used in any manner the user chooses in order to provide added functionality to the neural network structure. For example, new associating neurons could be added to the end of the list, or the list could be maintained in numerical order, alphabetical order, and so forth. Likewise, neurons which are frequently accessed could be moved towards the front of the list, or at the front of the list, such that more recently activated memories are always more accessible. This also means that older memories are at the end of the list and less likely to experience expression.

In this manner the order of the list can be used to represent the relative synaptic strengths or activation levels of the successor neurons to an initiating neuron without having to use weights to represent the strength of synaptic connections, if so desired.

The memory represented by any neuron can be expressed by simply expressing the neurons represented by the initiating neuron pointer and then the expressing the neuron represented by the associated neuron pointer. If the initiating pointer is zero, it is possible to express the elemental value of the elemental neuron. Otherwise, the process can be repeated for the initiating pointer—express its initiating neuron pointer and its associated neuron pointer, and so forth. Thus, any neuron can be fully expressed by expressing its parts in order.

It is possible to create neural network structures representing knowledge learnt. For example, if the following sentences of text are inputs:
LUCY^IS^CRYING^UNDER^THE^TABLE^.
JOHN^IS^PLAYING^IN^THE^PARK^.
PETER^IS^READING^IN^THE^CHAIR^.
MARY^IS^SLEEPING^UNDER^THE^TREE^.
JOHN^IS^RUNNING^IN^THE^RACE^.
PETER^IS^PLAYING^ON^THE^SWING^.
MARY^IS^TALKING^ON^THE^PHONE^, it is possible to create neurons that represent the following phrases or memories:
IS CRYING
IS RUNNING
IS READING
IS SLEEPING
IS PLAYING
IS TALKING In this case "IS^" has six successor neurons.

Similarly it is possible to create the following phrases or memories:
UNDER THE TABLE
UNDER THE TREE
IN THE PARK
IN THE CHAIR
IN THE RACE
ON THE SWING
ON THE PHONE Thus LUCY is associated with IS CRYING, but IS is associated with six different actions. By changing the expression of alternative successor neurons for IS, it is possible to express up to six different phrases/clauses:
LUCY IS CRYING
LUCY IS RUNNING
LUCY IS READING
LUCY IS SLEEPING
LUCY IS PLAYING
LUCY IS TALKING Although only the first phrase was ever learnt, or input to the neural network, it is possible to do the same for JOHN, PETER and MARY.

Effectively it is possible to generate new expressions based on the structure IS and IS. That is:

| LUCY IS | IS CRYING |
| JOHN IS | IS RUNNING |
| MARY IS | IS READING |
| LUCY IS | IS SLEEPING |
| PETER IS | IS PLAYING |
|         | IS TALKING |

Therefore, it is possible to create or express 30 (5×6) phrases/clauses that are all syntactically correct, and are also all semantically correct. Similarly:

| ON THE | THE TABLE |
| IN THE | THE PARK |

-continued

| UNDER THE | THE CHAIR |
|           | THE TREE |
|           | THE RACE |
|           | THE SWING |
|           | THE PHONE | which provides for the possibility of generating 21 phrases/clauses of this nature (3×7) which are all syntactically correct, but not all semantically correct.

Combining the two sets together gives the structure:
{*}IS{*}{*}THE{*}.

This provides for the expression of {5}IS{6}*{3}THE{7}, or 5×6×3×7=630 possible expressions, having learnt only seven input sentences. Thus the neural model allows the learning and building a neural structure of memories, and also allows the combining of those neurons or memories into new expressions or behavior, according to user defined processes. The brain can explore new concepts or suggestions that are syntactically possible with what has previously been learnt. With millions of neurons, it is possible to express billions of syntactically correct sentences. That is, the neural network structure provides an ideal method for creative expression.

By use of a neural network described above, it is possible to have a system that:
is able to learn;
has expression capabilities;
stores associations rather than data;
has an efficient usage of computer memory and storage space; and
is computationally efficient.

Thus the network is able to recognize patterns within patterns of associations. As such it may be of use in varying industries such as, for example, monitoring and predicting stock price movements, internet surveillance, security, computer virus detection, phrases in speech and text, clauses in speech and text, plagiarism detection, data compression, and so forth.

The neural network structure and processes described above may be implemented in software or hardware. If in hardware, they may be part of a chip, all of a dedicated chip, or an array of chips, all being elemental and or structural neurons. Elemental and structural neurons may be in part of the chip, or may be in a memory array of dedicated neurons. As all neurons exist, upon the first pass of data the first elemental neuron will learn the first element of the data. For example, the upper case letter "T" in the example used in FIG. 7. The next elemental neuron would learn the next element of the data. Again using the example of FIG. 7, the lower case letter "h". And so forth. As the elemental neurons and those in the lower levels of the neural network will be activated more frequently to create the associations in the deeper levels, they may require faster processor speeds, for best performance. Neurons at deeper levels will be activated less frequently and therefore could be stored in storage with slower processor speeds.

Therefore, there is provided a neural network based on the concepts of neurons including sensor and motor neurons, and synaptic connections. Each neuron in the brain can be represented by a single node in an array or memory in a simple manner. Neurons are fixed-length nodes in an array or memory. Each synaptic connection can be represented by pointers to other neurons within each node. Neural nodes in the array may consist solely and exclusively of pointers to other neurons in the data array. However, motor or sensor neurons contain a sensor value or motor value for interacting with the external environment. Each neuron contains connections to other neurons. If desired, neurons may also maintain other information such as, for example, the frequency of activation during learning, the number successor neurons, the number of precessor neurons, and so forth, to assist processing and to be used in the rules for creating associations, and for expression.

Elemental neurons, corresponding to sensory or motor neurons can be defined for interfacing to and interacting with external input devices or external output devices The neural network can be represented and built/constructed based on the neurons and synaptic associations, with appropriate rules for creating the neural structure and traversing the neural connections. The network learns by creating associations between neurons. For any neuron, its representation can be recalled and expressed, and exploration of multiple associations and permutations of its associations, with other neurons can be recalled or expressed. Neurons can represent memories, where a memory is defined as the expression of a neuron.

Interfacing with or learning or processing an experience of external sensory neuron events and creating memories of input experiences is represented by neurons and by new connections between neurons.

Interfacing with or learning or representing an activity of external motor neuron events and creating memories of output actions is represented by new neurons and by new connections between neurons.

The neural network can learn, it can express or recall or recollect memories, it can interact or express itself with the external environment, and has the ability to think (a process defined as exploring alternative neuron associations as described above) and to express itself creatively.

The present invention also extends to a computer usable medium comprising a computer program code or specially built digital processor chips customized to cause one or more processors to execute one or more functions to perform the methods described above.

Whilst there has been described in the foregoing description preferred embodiments of the present invention, it will be understood by those skilled in the technology that many variations or modifications is details of design, construction or operation may be made without departing from the present invention.

What is claimed:

1. A method of creating an artificial neural network for processing elemental data inputs using a processor, comprising:
    (a) creating data structures on a storage device that represent elemental neurons for each elemental data input, wherein the processor is configured to modify the data structures to represent the activation of elemental neurons in response to receipt of the corresponding elemental data input;
    (b) activating elemental neurons in an order corresponding to the order or proximity of elemental data inputs;
    (c) creating data structures on the storage device representing the addition of structural neurons to the artificial neural network where necessary to create associations between neurons, wherein the processor is configured to modify the data structures to represent the activation of the structural neurons in response to the activation of one of: elemental neurons, structural neurons and elemental and structural neurons, associated with each structural neuron; and
    (d) activating structural neurons in response to the order of the activation of elemental and/or structural neurons.

2. The method of claim 1, wherein each structural neuron is connected to a neuron, which acts as an initiating neuron, and is connected to another neuron, which acts as an associated neuron.

3. The method of claim 2, wherein multiple structural neurons are activated in response to the activation of their initiating neurons and multiple structural neurons are activated in response to the activation of their associated neurons.

4. The method of claim 2, wherein a structural neuron is activated in response to the activation of its initiating neuron and its associated neuron.

5. The method of claim 2, wherein the initiating neuron can be an elemental neuron or a structural neuron.

6. The method of claim 2, wherein the associated neuron can be an elemental neuron or a structural neuron.

7. The method of claim 2, wherein adding structural neurons to the artificial neural network where necessary to create new associations between activated neurons comprises:
    (a) identifying a pair of neurons that are activated during elemental data inputs and that are not associated by a structural neuron;
    (b) adding a structural neuron to the artificial neuronal network;
    (c) assigning one neuron of the pair of activated neurons as the initiating neuron of the newly added structural neuron; and
    (d) assigning the other of the pair of activated neurons as the associated neuron of the newly added structural neuron.

8. The method of claim 5, wherein the artificial neural network comprises a first layer of elemental neurons and successive layers of structural neurons.

9. A system for forming an artificial neural network for processing elemental data inputs, comprising:
    (a) a processor configured to receive elemental data inputs;
    (b) a memory operatively connected to the processor and containing an addressable array of fixed length nodes where each node represents a neuron of the artificial neural network, and each node includes at least four fixed length pointers;
    (c) wherein the processor is configured to:
        (i) assign a pointer within a node within the array of fixed length nodes to represent one of: a value of an elemental data input, or an association to another node;
        (ii) activate nodes representing the value of elemental data inputs,
        (iii) assign unused nodes within the array of fixed length nodes to create new associations between activated nodes,
        (iv) activate associating nodes in response to the activation of the nodes representing the value of an elemental data input, and
        (v) activate nodes in the array that represent associations of activated nodes; and
    (d) wherein the processor is configured to assign an unused node within the array of fixed length nodes to create a new association between a pair of activated nodes by:
        (i) selecting an unused node from within the array of fixed length nodes;
        (ii) pointing a first of the at least four fixed length pointers of the selected node to the first of the pair of activated nodes, and
        (iii) pointing a second of the at least four fixed length pointers of the selected node to a second of the pair of activated nodes.

10. The system of claim 9, wherein the first of the at least four fixed length pointers and the second of the at least four fixed length pointers are for expression and learning.

11. The system of claim 10, wherein third and fourth pointers are used to maintain a list of nodes which are by an initiating node, the initiating node being the first of the pair of activated nodes within an association.

12. The system of claim 11, wherein the third pointer of the initiating node points to the list of nodes, each node of the list being an associating node, and the initiating node is the first of the pair of nodes within their association.

13. The system of claim 12, wherein the fourth pointer is used to maintain the list of the nodes which share a common initiating node.

14. The system of claim 11, wherein fifth and sixth pointers are used to maintain a list of nodes which are activated by an associated node, the associated node being the second of the pair of nodes within their association.

15. The system of claim 14, wherein the fifth pointer of the associated node points to the list of nodes, each node of the list being an associating node, and the associated node is the second of the pair of nodes within their association.

16. The system of claim 15, wherein the sixth pointer is used to maintain the list of the nodes which share a common associated node.

17. The system of claim 14, wherein the processor is configured to maintain information concerning the number of associated nodes for each node within the array.

18. The system of claim 9 further comprising assigning a node within the array of nodes as a root node, wherein the root node is used to maintain a list of elemental nodes, an elemental node being a node which contains an elemental value.

19. A method of creating an artificial neural network for processing elemental data inputs, comprising:
   (a) assigning a memory within a computer system to contain an addressable array of nodes where each node includes at least four pointers;
   (b) assigning a node within the array of nodes to represent one of: a value of an elemental data input, and an association between two other nodes;
   (c) activating a node representing the value of the elemental data input;
   (d) assigning an unused node within the array of nodes to create a new association between a pair of activated nodes;
   (e) activating other nodes in the array that represent associations with the activated nodes;
   (f) activating nodes in the array that represent an association between activated nodes; and
   (g) assigning an unused node within the array of fixed length nodes to create a new association between a pair of activated nodes by:
      (i) selecting an unused node from within the array of nodes,
      (ii) pointing a first of the at least four pointers to the assigned node to the first of the pair of activated nodes, and
      (iii) pointing a second of the at least four pointers of the assigned node to a second of the pair of activated nodes.

20. The method of claim 19, wherein the first of the at least four pointers and the second of the at least four pointers are for expression and learning.

21. The method of claim 20, wherein third and fourth pointers are used to maintain a list of nodes which are activated by an initiating node, the initiating node being the first of the pair of nodes within an association.

22. The method of claim 21, wherein the third pointer of the initiating node points to the list of nodes, each node of the list being an associating node, and the initiating node is the first of the pair of nodes within the association.

23. The method of claim 21, wherein the fourth pointer is used to maintain the list of the nodes which share a common initiating node.

24. The method of claim 19, wherein each node in the array represents a neuron of the artificial neural network.

25. The method of claim 21, wherein fifth and sixth pointers are used to maintain a list of nodes which are activated by an associated node, the associated node being the second of the pair of nodes within the association.

26. The method of claim 25, wherein the fifth pointer of the associated node points to the list of nodes, each node of the list being an associating node, and the associated node is the second of the pair of nodes within the association.

27. The method of claim 25, wherein the sixth pointer is used to maintain the list of the nodes which share a common associated node.

28. The method of claim 25, wherein the processor is configured to maintain information concerning the number of associated nodes for each node within the array.

29. The method of claim 19 further comprising assigning a node within the array of nodes as a root node, wherein the root node is used to maintain a list of elemental nodes, an elemental node being a node which contains an elemental value.

30. The method of claim 19, wherein each node in the array represents either an elemental data input, a sequence of elemental data inputs or a sequence of associating nodes.

31. The method of claim 25, wherein learning is creating new nodes to represent a sequence of elemental data inputs.

32. The method of claim 25, wherein expression is the output of a sequence of elemental values represented by any node.

33. The method of claim 25, wherein expression of a single node is the expression of its initiating node and then its expression of its associated node; and wherein if that the expressed node is an elemental data input, the elemental data value is output; and wherein if the expressed node is not an elemental data input, then the expressed node expresses its initiating node and then expresses its associated node.

34. The method of claim 32, wherein expression allows a complete sequence of events to be represented by a single neuron.

35. The method of claim 34, wherein the complete sequence of events is reproduced by activating the node and the nodes that represent the associations; the nodes that represent the association being an initiating node and an associated node to the node being expressed; the nodes being expressed in the same relative position or order in which they were created.

36. A system including an artificial neural network configured to identify characteristics of elemental data inputs, comprising:
   (a) a processor configured to receive the elemental data inputs;
   (b) a memory operatively connected to the processor and containing an addressable array of fixed length nodes, where each node includes at least four fixed length pointers and each node in the array represents a neuron of the artificial neural. network;
   (c) wherein the first pointer identifies a first node within the array as an initiating node;
   (d) wherein the second pointer identifies a second node within the array as an associated neuron, or a NULL value in the case of an elemental. node;

(e) wherein the processor is configured to activate a node corresponding to elemental nodes, the elemental nodes corresponding to elemental data inputs;

(f) wherein the processor is configured to potentiate each node of a list of nodes which have in common an initiating node which has been activated;

(g) wherein the processor is configured to activate a potentiated node when its associated node is activated; and (h) wherein the processor is configured to express the elemental nodes by outputting the values which were used to create the elemental node.

37. The system of claim 36, wherein the first of the at least four fixed length pointers and the second of the at least four fixed length pointers are for expression and learning.

38. The system of claim 37, wherein third and fourth pointers are used to maintain a list of nodes which are activated by an initiating node, the initiating node being a first of a pair of activated nodes within an association.

39. The system of claim 38, wherein the third pointer of the initiating node points to the list of nodes, each node of the list being an associating node, and the initiating node is the first of the pair of nodes within the association.

40. The system of claim 39, wherein the fourth pointer is used to maintain the list of the nodes which share a common initiating node.

41. The system of claim 38, wherein fifth and sixth pointers are used to maintain a list of nodes which are activated by an associated node, the associated node being a second of the pair of nodes within the association.

42. The system of claim 41, wherein the fifth pointer of the associated node points to the list of nodes, each node of the list being an associating node, and the associated node is the second of the pair of nodes within the association.

43. The system of claim 42, wherein the sixth pointer is used to maintain the list of the nodes which share a common associated node.

44. The system of claim 36, wherein the processor is configured to maintain information concerning the number of associated nodes for each node within the array.

45. The system of claim 36 further comprising assigning a node within the array of nodes as a root node, wherein the root node is used to maintain a list of elemental nodes, an elemental node being a node which contains an elemental value.

46. A system including an artificial neural network configured to identify characteristics of elemental data inputs, comprising:

(a) a processor configured to receive the elemental data inputs;

(b) a memory operatively connected to the processor and containing an addressable array of fixed length nodes, where each node includes at least four fixed length pointers and each node in the array represents a neuron of the artificial neural. network;

(c) wherein the first pointer identifies a first node within the array as an initiating node;

(d) wherein the second pointer identifies a second node within the array as an associated neuron, or a NULL value in the case of an elemental node;

(e) wherein the processor is configured to activate a node corresponding to elemental nodes, the elemental nodes corresponding to elemental data inputs;

(f) wherein the processor is configured to activate a node when its initiating node and associated node have both been activated; and (h) wherein the processor is configured to express the elemental nodes by outputting the values which were used to create the elemental node.

47. A system including an artificial. neural. network configured to identify characteristics of elemental data inputs, comprising:

(a) a processor configured to receive the elemental data inputs comprising a sequence of characters;

(b) a memory operatively connected to the processor and containing an addressable array of fixed length nodes, where each node in the array represents a neuron of the artificial. neural. network;

(c) the processor being configured to learn recurring patterns within an input data set, and to represent and store the recurring patterns within the memory.

48. A system as claimed in claim 47, wherein the processor and the memory are able to be used for at least one selected from the group consisting of: bioinformatics, data mining, search, and comparative analysis.

* * * * *